(12) United States Patent
Fielding et al.

(10) Patent No.: US 12,737,961 B2
(45) Date of Patent: Sep. 15, 2026

(54) GRAPHICS TEXTURE MAPPING

(71) Applicant: Arm Limited, Cambridge (GB)

(72) Inventors: Edvard Fielding, Trondheim (NO); Rodolfo Luis Jalabert Castellanos, Trondheim (NO)

(73) Assignee: Arm Limited, Cambridge (GB)

( * ) Notice: Subject to any disclaimer, the term of this patent is extended or adjusted under 35 U.S.C. 154(b) by 120 days.

(21) Appl. No.: 18/890,328

(22) Filed: Sep. 19, 2024

(65) Prior Publication Data

US 2025/0111584 A1 Apr. 3, 2025

(30) Foreign Application Priority Data

Sep. 29, 2023 (GB) ..................................... 2314958

(51) Int. Cl.
*G06T 15/00* (2011.01)
*G06T 15/04* (2011.01)
*G06T 1/20* (2006.01)

(52) U.S. Cl.
CPC ................ *G06T 15/04* (2013.01); *G06T 1/20* (2013.01)

(58) Field of Classification Search
None
See application file for complete search history.

(56) References Cited

U.S. PATENT DOCUMENTS

2007/0080972 A1* 4/2007 Gruber .................... G06T 15/04 345/582
2019/0311520 A1* 10/2019 Van Benthem ....... G06F 9/3877
2022/0309732 A1* 9/2022 Woo ..................... H04N 19/423
2023/0042292 A1* 2/2023 King ...................... G06T 11/10
2023/0085561 A1* 3/2023 King ...................... G06F 30/31 345/582

FOREIGN PATENT DOCUMENTS

GB 2604193 A 8/2022

OTHER PUBLICATIONS

Combined Search and Examination Report under Sections 17 and 18(3), dated Mar. 25, 2024, GB Patent Application No. GB2314958.6, pp. 1-5.

* cited by examiner

*Primary Examiner* — Zhihan Zhou
(74) *Attorney, Agent, or Firm* — Pearl Cohen LLP

(57) ABSTRACT

When performing a texture sampling operation that uses the results of plural texture filtering operations to provide an overall output sampled texture value in a graphics processing system, it is determined whether a texture filtering operation in the set of plural texture filtering operations that are to be performed to provide the overall output sampled texture value can be at least partially merged with another texture filtering operation in the set of texture filtering operations. If so a merged texture filtering operation is performed for the two texture filtering operations, with the result of the merged texture filtering operation being used when providing the overall output sampled texture value.

21 Claims, 16 Drawing Sheets

| Sample: | Texels with non-zero weights: |
| --- | --- |
| S0 | [0,1], [1,1] |
| S1 | [2,0], [1,1], [2,1] |
| S2 | [2,0], [3,0], [2,1], [3,1] |
| S3 | [3,0], [4,0], [3,1], [4,1] |
| S4 | [4,0], [5,0], [4,1], [5,1] |
| S5 | [5,0], [6,0], [5,1] |
| S6 | [6,0], [7,0] |

GRAPHICS TEXTURE MAPPING

BACKGROUND

The technology described herein relates to performing texture mapping in graphics processing systems.

It is common in graphics processing systems to generate colours for sampling positions in a render output (e.g. an image (a frame) to be displayed) by applying so-called textures or texture data to the surfaces to be drawn.

A graphics texture is typically configured as an array of data elements (texture elements (texels)) (a "texture map"), each texture data element (texel) having a corresponding set of texture data stored for it (such as colour, luminance and/or light/shadow, etc., values). The texture (data) value for a given position within the texture is then determined by sampling the texture at that position (e.g. using a bilinear sampling (filtering) process).

Thus, when applying a texture to a surface to be rendered for a render output, the sampling position in the render output to which the texture is to be applied is mapped to a position in the texture, and the texture is sampled at that position using an appropriate filtering process (such as a bilinear filtering process), to determine the output texture data value to be used for the sampling position in the render output.

A texture filtering operation will, typically, need and use the values of plural texels (texture data elements) in the texture being sampled, and combine those texel values in an appropriate manner to provide the output sampled texture value. For example, when performing a bilinear filtering operation to sample a texture, a 2×2 "quad" of texture data elements (texels) will be used for the bilinear filtering operation.

Some texture sampling operations combine a set of plural individual filtered texture values (samples), to provide an overall output sampled texture value. For example, when performing anisotropic filtering a plurality of bilinear samples spaced along a line (the anisotropy direction) in the texture are taken and combined to provide the overall anisotropic filtering (sampling) result.

The Applicants believe that there remains scope for improvements to the operation of graphics processors when sampling a texture to provide an output sampled texture value for use when rendering an output.

BRIEF DESCRIPTION OF THE DRAWINGS

Embodiments of the technology described herein will now be described by way of example only and with reference to the accompanying drawings, in which.

Like numerals are used for like features in the drawings where appropriate.

DETAILED DESCRIPTION

Figure 1:
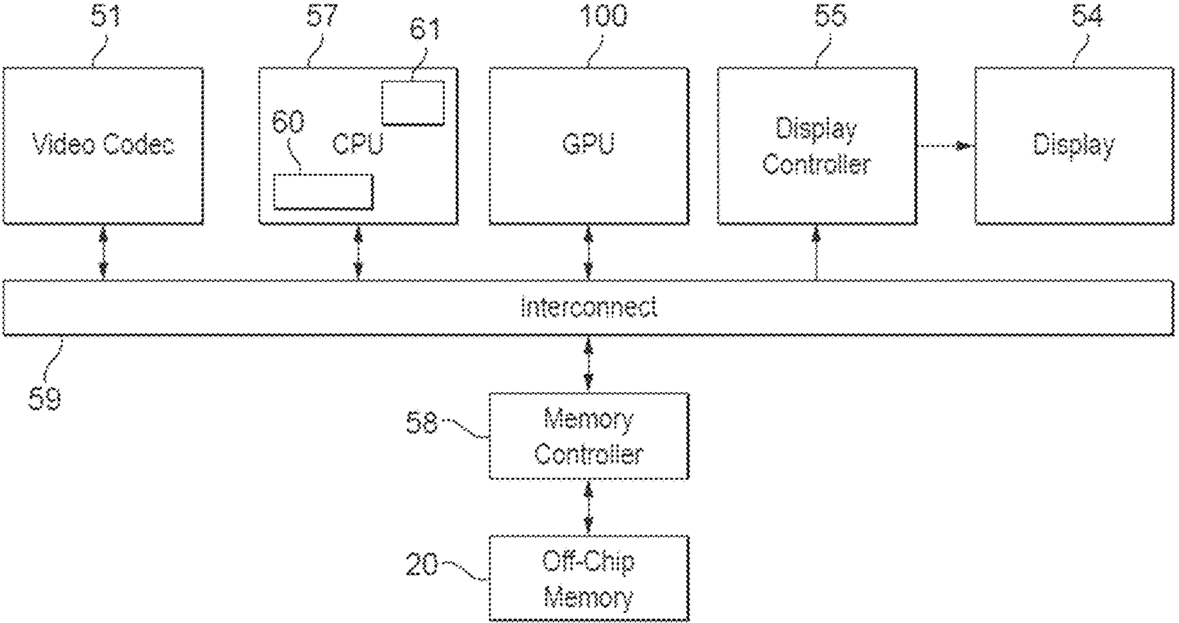
FIG. 1 shows an exemplary data processing system in which the technology described herein may be implemented.

A first embodiment of the technology described herein comprises a method of operating a graphics processor when sampling a texture to provide an output sampled texture value for use when rendering an output, the sampled texture comprising an array of texture data elements, each texture data element having an associated texture value;

the method comprising, when performing a texture sampling operation that uses the results of plural texture filtering operations to provide an overall output sampled texture value, each texture filtering operation using a set of one or more texture data elements from the texture being sampled to provide a corresponding output filtered texture value:

determining whether a texture filtering operation in the set of plural texture filtering operations to be performed to provide the overall output sampled texture value can be at least partially merged with another texture filtering operation in the set of texture filtering operations to be performed to provide the overall output sampled texture value;

and when it is determined that a texture filtering operation in the set of plural texture filtering operations to be performed to provide the overall output sampled texture value can be at least partially merged with another texture filtering operation in the set of texture filtering operations to be performed to provide the overall output sampled texture value, performing a merged texture filtering operation for the two texture filtering operations; and using the result of the merged texture filtering operation when providing the overall output sampled texture value.

A second embodiment of the technology described herein comprises a graphics processor, the graphics processor comprising:

a texture mapping unit configured to sample textures to provide output sampled texture values for use when rendering an output, each sampled texture comprising an array of texture data elements, each texture data element having an associated texture value;

wherein the texture mapping unit comprises:

a texture filtering circuit configured to perform texture filtering operations, each texture filtering operation using a set of one or more texture data elements from a texture to provide a corresponding output filtered texture value; and a texture filtering operation "merging" circuit configured to, when the texture mapping unit is to perform a texture sampling operation that uses the results of plural texture filtering operations to provide an overall output sampled texture value, each texture filtering operation using a set of one or more texture data elements from the texture being sampled to provide a corresponding output filtered texture value:

determine whether a texture filtering operation in the set of plural texture filtering operations to be performed to provide the overall output sampled texture value can be at least partially merged with another texture filtering operation in the set of texture filtering operations to be performed to provide the overall output sampled texture value;

and when it is determined that a texture filtering operation in the set of plural texture filtering operations to be performed to provide the overall output sampled texture value can be at least partially merged with another texture filtering operation in the set of texture filtering operations to be performed to provide the overall output sampled texture value, cause the texture filtering circuit to:

perform a merged texture filtering operation for the two texture filtering operations; and use the result of the merged texture filtering operation when providing the overall output sampled texture value.

The technology described herein relates to texture mapping in graphics processing, and in particular to the sampling of textures to provide an output sampled texture value when the texture sampling process uses a set of plural individual filtered (sampled) texture values to provide an overall output sampled texture value (such as is the case when performing anisotropic filtering of textures).

In the technology described herein, rather than simply performing each individual texture filtering operation that is to be performed for the overall texture sampling operation separately, it is first determined for a texture filtering operation, whether that texture filtering operation can be merged with another one of the texture filtering operations to be performed. If so, the texture filtering operations are replaced with (at least one) "merged" texture filtering operation.

In other words, the technology described herein seeks to identify opportunities where the filtering of texture data elements for an overall texture sampling operation can be "merged", and, if so, then "merges" the texture filtering operations for the overall texture sampling operation in question.

As will be discussed further below, this can then reduce the number of texture data element "fetches" and texture filtering operations that need to be performed when performing the overall texture sampling operation, and, correspondingly, the amount of data that needs to be provided to and handled by the texture filtering circuit(s) (pipeline). The technology described herein can accordingly provide a more efficient texture sampling operation.

The Applicants have recognised in this regard that when performing texture sampling operations, such as anisotropic filtering, that use a plurality of filtered texture values (samples) when generating an overall output sampled texture value, it can often be the case that some or all of the individual texture filtering operations can be combined (consolidated), for example because some of the individual texture filtering operations may use some or all of the same texture data elements from the texture. For example, when performing anisotropic filtering, the samples along the anisotropy direction in the texture are often spaced by a distance of one texel, meaning that adjacent bilinear samples along the anisotropy direction can often sample the same four texture data elements (texels) in the texture.

The overall texture sampling operation that is being performed and considered in the technology described herein can be any desired and suitable texture sampling operation that uses a set of plural individual texture filtering operations to then provide an overall output sampled texture value for further use (e.g., and in an embodiment, for use when rendering an output, such as a frame for display).

As discussed above, one example of such a texture sampling operation is anisotropic filtering, and so in one embodiment the overall texture sampling operation is to anistropically sample a texture. However, there are other texture sampling operations that use plural individual filtered samples, such as when supersampling a texture, when performing: percentage closer filtering (PCF) shadow mapping, screen-space ambient occlusion (SSAO), motion blur, Bokeh blur, depth-of-field blur, or bicubic filtering, etc., and the technology described herein can equally be (and is in an embodiment) used for such operations.

The overall texture sampling operation that is being performed will use (and appropriately combine) the results of a set of plural individual texture filtering operations. There may be any desired number of plural texture filtering operations being combined, and this will depend on the exact type and configuration of the overall texture sampling operation in question.

The individual texturing filtering (sampling) operations that contribute to the overall texture sampling operation can be any suitable and desired texture filtering operation. Each texture filtering operation is in an embodiment the same (type of) operation as all the other texture filtering operations in the set (thus all the texture filtering operations are in an embodiment bilinear filtering operations, for example).

Each filtering operation will use a set of one or more texture data elements to determine an output of the filtering operation. In an embodiment each texture filtering operation uses the same number and configuration of one or more texture data elements.

In an embodiment, the texture filtering operations each use a set of plural texture data elements from the texture to provide an output filtered texture value, such as, and in an embodiment, a set of four texture data elements.

Correspondingly, in an embodiment, the (individual) texture filtering operations are each a bilinear filtering operation (that uses a set of four texture data elements to provide an output filtered texture value). However, other forms of texture filtering operation, for example that use more or fewer texture data elements could be being performed, if desired.

The determination of whether a texture filtering operation in a set of plural texture filtering operations to be performed to provide an overall output sampled texture value can be at least partially merged with another texture filtering operation in the set of texture filtering operations to be performed to provide the overall output sampled texture value can be performed in any suitable and desired manner.

In an embodiment, this comprises (e.g., and in an embodiment, first) determining that the texture filtering operations each use texels (in an embodiment only) from the same texture, and in an embodiment from the same surface (of the texture in question). In particular, it is in an embodiment ensured that in all cases in which (u, v) coordinates lead to the same (s, t) texel indices, but the texel data at those indices does not contain/refer to the exact same data (such as texels at the same coordinate indices (s, t) but belonging to different MIP-levels, etc.), then the operations will not be merged.

Thus, in an embodiment, at least in the case where the texture comprises plural mipmaps, it is considered whether the texture filtering operations being considered are sampling from the same mipmap level in the texture (with it being determined that the texture filtering operations cannot be merged in the case where the texture filtering operations being considered are sampling from different mipmap levels, even if in the same texture).

Similarly, at least in the case of a cube texture, in an embodiment it is (also) considered whether the texture filtering operations being considered are sampling from the same cube face (with it being determined that the texture filtering operations cannot be merged in the case where the texture filtering operations being considered are sampling from different faces of the cube texture).

Correspondingly, at least in the case of a 3D texture, in an embodiment it is (also) considered whether the texture filtering operations being considered are sampling from the same depth (Z coordinate) in the 3D texture (with it being determined that the texture filtering operations cannot be merged in the case where the texture filtering operations being considered are sampling from different depths of (at different Z coordinates in) (different 2D surfaces in) the 3D texture).

This said, it would also be possible to merge volume texture samples (voxels), and in that case, it is in an embodiment determined whether the texture filtering operations sample the same texture volume or not.

In one embodiment, the determining of whether a texture filtering operation in a set of plural texture filtering operations to be performed to provide an overall output sampled texture value can be at least partially merged with another texture filtering operation in the set of texture filtering operations to be performed to provide the overall output sampled texture value comprises determining whether the texture filtering operations being considered use the same texture data element(s) as each other (with it being determined that the texture filtering operations can be merged in the case where the texture filtering operations being considered do use the same texture data elements as each other).

Thus, in the case of bilinear filtering operations, in this embodiment two bilinear texture filtering operations will (only) be "merged" in the manner of the technology described herein when each bilinear filtering operation uses the same four texture data elements.

In an embodiment, the determination of whether the texture filtering operations use the same texture data elements is based on and uses (in an embodiment only) the positions in the texture of the texture data elements to be used for the texture filtering operations (with it being determined that texture filtering operations use the same texture data elements when the texture filtering operations use texture data elements having the same positions in the texture).

The positions of the texture data elements in the texture that are to be used for the texture filtering operations being considered can be determined in any suitable and desired manner. In an embodiment this uses and is based on the position in the texture that is being sampled for each texture filtering operation being considered.

Typically a texture filtering operation will use a position (coordinates) in the texture that is to be sampled, with that position then being used to identify the texture data elements in the texture that are to be used for the texture filtering operation. In an embodiment, the position to be sampled in the texture is converted in an appropriate manner to the positions of the actual texture data elements (texels) from the texture to be used for the texture filtering operation. Thus the positions in the texture (e.g., and in an embodiment, the integer parts of the position coordinates) for the different texture filtering operations being considered are in an embodiment compared to determine if the texture filtering operations being considered use the same texture data elements or not.

Thus in an embodiment, the determining of whether a texture filtering operation in a set of plural texture filtering operations to be performed to provide an overall output sampled texture value can be at least partially merged with another texture filtering operation in the set of texture filtering operations to be performed to provide the overall output sampled texture value comprises comparing the positions in the texture being sampled by each of the texture filtering operations to determine whether the texture filtering operations can be merged (and in an embodiment to determine whether the texture filtering operations being considered use the same texture data element(s) as each other (with it being determined that the texture filtering operations can be merged in the case where the texture filtering operations being considered do use the same texture data elements as each other)).

The above embodiment primarily considers whether the texture filtering operations being considered use the same set of texels as each other (and merges the filtering operations if they do).

However, the Applicants have recognised that even if two texture filtering operations do not use exactly the same set of texels, it could still be the case that there is, for example, a single set of texels that can be processed in a single texture filtering operation for the texture filtering operations being considered, such that there could still be a "merged" texture filtering operation that could be performed for (and instead of) the different texture filtering operations being considered.

For example, for some texture filtering operations, while using in principle a particular set of plural texture data elements, it could be the case that one or more of the texture data elements of the overall set of texture data elements that is to be used for the filtering operation will not actually contribute to the output of the texture filtering operation, for example because they have a contribution "weight" of zero for that particular instance of the texture filtering operation.

This may arise, for example, for a bilinear filtering operation where the position being sampled is actually on or close to an axis-aligned line joining two texture data elements in the texture, as in that case, the contribution weights for the other two texture data elements that would normally make up the bilinear sample are likely to be set to zero or close to zero.

The Applicants have further recognised in this regard that this can then mean, for example, that two such bilinear filtering operations that in themselves use different texture data elements to each other, may when considered together in fact only use (up to) four different texture data elements in total, such that they can then still be replaced with a "merged", single bilinear filtering operation (that uses four texels).

Thus in another particularly embodiment, the determining of whether a texture filtering operation in a set of plural texture filtering operations to be performed to provide an overall output sampled texture value can be at least partially merged with another texture filtering operation in the set of texture filtering operations to be performed to provide the overall output sampled texture value takes account of and uses the relative contributions (contribution weights) of the texture data elements to the respective texture filtering operations.

In an embodiment the relative contributions (weights) for the different texture data elements to the different texture filtering operations are used to (try to) identify any texture data elements for the texture filtering operations being considered that in practice have a zero (no) contribution to (any result of) the texture filtering operations being considered.

Correspondingly, this is then in an embodiment used to determine whether there is a reduced set of texture data elements that actually contribute to the texture filtering operations being considered (whether only some but not all of the texture data elements for the texture filtering operations being considered actually contribute to the results of the texture filtering operations being considered).

For example, in the bilinear filtering example discussed above, it may be identified that each bilinear filtering operation in fact only uses two texels, so that rather than 8 texels needing to be processed for the two bilinear filtering operations, only 4 texels will actually contribute to the results of the two bilinear filtering operations, which can accordingly be processed using one bilinear filtering operation only.

Thus in an embodiment, the determining of whether a texture filtering operation in a set of plural texture filtering operations to be performed to provide an overall output sampled texture value can be at least partially merged with another texture filtering operation in the set of texture filtering operations to be performed to provide the overall output sampled texture value uses the relative contributions (contribution weights) of the texture data elements to the respective texture filtering operations to determine whether there is a reduced set of texture data elements that actually contribute to the texture filtering operations being considered (with it being determined that the texture filtering operations cannot be merged in the case where there isn't (is other than) a reduced set of texture data elements that actually contribute to the texture filtering operations being considered).

When taking account of the relative contributions (contribution weights) of the texture data elements to the respective texture filtering operations being considered, then it could just be the respective contributions (weights) within the individual texture filtering operations that are considered in this regard (and in one embodiment that is what is done).

However, in an embodiment, where a further contribution (weighting) factor will be applied to each respective texture filtering operation (when combining the respective texture filtering operations to provide the overall final output sampled texture value), such as would be the case in anisotropic filtering (where an anisotropy weight is applied to each bilinear sample along the anisotropy direction when combining the bilinear samples to provide the overall anisotropic filtering result), then the individual contribution weights within a given texture filtering operation are in an embodiment combined with (e.g. multiplied by) the contribution weight for the texture filtering operation in question (to the overall texture sampling result), before then considering which texture data elements the texture filtering operations being considered actually use (i.e. have non-zero contribution weights in the overall, final output of the combined texture filtering operations).

The Applicants have recognised that this will have the effect of potentially making more texture data elements have zero contribution weight and so further increase the possibility of identifying texture filtering operation merging opportunities.

In one embodiment, as well as considering the relative contributions of the texture data elements to the texture filtering operations (to identify if there is a reduced set of "contributing" texture data elements), the (relative) configuration of the texture data elements that will actually contribute to the texture filtering operations is also considered and taken into account when determining whether the texture filtering operations can be merged.

In this case it is in an embodiment (only) determined that the texture filtering operations being considered can be (and should be) merged when (at least some of) the reduced set of texture data elements that will actually contribute to the texture filtering operations have a particular, in an embodiment selected, in an embodiment predefined configuration (and correspondingly it is in an embodiment determined that the texture filtering operations being considered cannot be merged when the texture data elements that will actually contribute to the texture filtering operations do not have (other than have) a particular, in an embodiment selected, in an embodiment predefined configuration).

The particular configuration(s) that merging is permitted for in these embodiments can be any desired and suitable configuration of the (contributing) texture data elements. This may be, and is in an embodiment, based on the type of texture filtering operations that are being considered and performed.

For example, where the texture filtering operations being considered are bilinear filtering operations, in an embodiment it is (only) determined that the texture filtering operations being considered can be (and should be) merged when (at least some of) the texture data elements that will actually contribute to the texture filtering operations have a bilinear filtering configuration (footprint) in the texture, i.e. comprise a 2×2 "quad" of adjacent texture data elements.

Similar considerations may be and are in an embodiment applied to texture filtering operations that are not bilinear filtering operations.

In another embodiment, it is determined that the texture filtering operations can be merged when there is a reduced set of contributing texture data elements, irrespective of (and without considering) the configuration of the texture data elements in that reduced set.

In this case, it is in an embodiment (simply) considered whether the number of contributing texture data elements in the reduced set can be appropriately processed (filtered) using (in) fewer "merged" texture filtering operations (e.g. a single texture filtering operation) than the original texture filtering operations being considered (with it being determined that the texture filtering operations can (and should) be merged in the case where they can be processed using (replaced with) fewer texture filtering operations).

In this case, the number of texture filtering operations that will need to be performed for the reduced set of contributing texture data elements is in an embodiment determined based on how many texture data elements each texture filtering operation can (will) process. Thus, where bilinear filtering is being performed, it is in an embodiment considered how many bilinear filtering operations will be needed to process the reduced set of contributing texture data elements (as compared to the original number of bilinear filtering operations being considered).

In this regard, it would be possible to just consider respective pairs of texture filtering operations, with it correspondingly being determined that a pair of texture filtering operations can be merged when (and only when) the pair of texture filtering operations can be replaced with a single texture filtering operation.

Alternatively, larger numbers of texture filtering operations could be considered for (potential) merging, with it correspondingly being determined that the texture filtering operations can be merged when (and only when) the texture filtering operations can be replaced with fewer texture filtering operations (e.g. when three texture filtering operations can be replaced with two texture filtering operations).

In these embodiments the relative contributions of the texture data elements to the texture filtering operations being considered can be identified and tracked in any suitable and desired manner.

In an embodiment, this is done by generating and maintaining an array (e.g. a matrix) representing the texture data elements (in an embodiment in their relative positions in the texture) and their contribution weights, with the array (matrix) then being assessed to determine which texture data elements actually contribute to the output of the filtering operations (and, where appropriate, the configuration of the contributing texture data elements).

In an embodiment, the determining of whether a texture filtering operation in a set of plural texture filtering operations to be performed to provide an overall output sampled texture value can be at least partially merged with another texture filtering operation in the set of texture filtering operations to be performed to provide the overall output sampled texture value comprises an initial "coarse" check of whether the positions in the texture being sampled by the texture filtering operations are greater than a particular, in an embodiment selected, in an embodiment predefined, threshold distance apart or not (with it being determined that the texture filtering operations cannot be merged in the case where the positions in the texture being sampled by the texture filtering operations being considered are spaced by more than the threshold distance).

The Applicants have recognised in this regard that if texture filtering operations are sampling positions that are, e.g., greater than a particular number of texels (e.g. 2 or 3 texels) apart, then it is unlikely that the texture filtering operations will be able to be merged, and so this initial check can be used to avoid having to do any more sophisticated merger determination where that is unlikely to be beneficial.

When it is determined that texture filtering operations should be merged, then an appropriate merged texture filtering operation is performed for the texture filtering operations being considered. There may be one or more merged texture filtering operations performed for the texture filtering operations being considered.

The "merged" texture filtering operation(s) should, and in an embodiment do, replace the texture filtering operations that are being merged (i.e. are performed instead of the texture filtering operations being considered (and so the texture filtering operations that are merged will not themselves be performed)).

As discussed above, in one embodiment, a pair of texture filtering operations are replaced with a single merged texture filtering operation.

A (and each) merged texture filtering operation is in an embodiment of the same form as the texture filtering operations that are being merged. Thus, for example, and in an embodiment, two or more bilinear filtering operations will be replaced with one or more bilinear filtering operations.

The merged texture filtering operation(s) should be, and is in an embodiment, so as to produce the same result (for contribution to the overall texture sampling output) as if the original texture filtering operations (that are being replaced) were being performed.

This can be achieved in any appropriate and desired manner. For example, and in an embodiment, the position being sampled, and/or the contribution weights for the filtering process, for the merged filtering operation is or are in an embodiment set appropriately so that the same (the correct) result will be produced.

In an embodiment, where a merged filtering operation uses texture data elements that contribute to plural of the texture filtering operations that are being merged, then all the contribution weights for a given texture data element from each of the texture filtering operations being merged are in an embodiment (first) combined (added together) to give a contribution weight for that texture data element in the merged texture filtering operation, with the "merged" texture filtering operation then using the so-combined contribution weights.

Again, in this case, any texture filtering operation contribution weight is in an embodiment first factored into the individual texel weights, before the weights for the merged filtering operation are determined.

(This is in contrast to, for example, generating an averaged position in the texture to sample for the merged texture filtering operation (which in an embodiment is not done).)

Thus, for example, and in an embodiment, where two bilinear filtering operations that each use the same set of four texels are being merged, in an embodiment for each texel, the weights for that texel from each bilinear filtering operation are added together, with that combined weight then being used for the texel in the merged bilinear filtering operation (which should, and in an embodiment does, use the same set of four texels as each of the bilinear filtering operations being merged, but using the new, merged contribution weights).

Thus in an embodiment, the texture filtering operations are merged by, for each respective texture data element, adding together all the contribution (interpolation) weights for that texture data element from the texture filtering operations being merged, and then performing a texture filtering operation using the summed contribution weights (for the respective texture data elements).

It will be appreciated that when operating in the manner of the technology described herein, a plurality of texture filtering operations will need to be considered in order to be able to determine whether the texture filtering operations can be "merged" or not. This can be facilitated in any suitable and desired manner.

For example, the texture mapping unit could maintain a pool of texture filtering operations for an overall texture sampling operation that are ready (and waiting) to be performed, and then try to merge the texture filtering operations (as appropriate) from that pool.

In an embodiment, the merging determination process operates to consider successive texture filtering operations in turn (from the set of texture filtering operations that make up the overall texture sampling operation), to see if they can be merged. In this case, respective, successive pairs of texture filtering operations could be considered, but in an embodiment the process is so as to consider whether a next texture filtering operation can be merged with a (the) previous texture filtering operation (which may itself be a merged operation) or not, with the next texture filtering operation either being merged with the previous texture filtering operation or the previous texture filtering operation being sent for processing and a new "merging" sequence being started (and so on, until all the texture filtering operations in the set have been considered).

Thus in an embodiment, the merging process considers whether a first texture filtering operation in the set can be merged with another texture filtering operation in the set of texture filtering operations making up the overall texture sampling operation.

If not, then in an embodiment the first texture filtering operation is sent for processing (as it is).

If so, the two texture filtering operations are in an embodiment merged and it is then considered whether a next texture filtering operation in the set can be merged with that merged operation, and so on, until a next texture filtering operation cannot be merged with the existing merged operation (or all of the texture filtering operations in the set have been considered).

When a next texture filtering operation cannot be merged with the current (previous) texture filtering operation (which may itself be a merged texture filtering operation), or all of the texture filtering operations in the set have been considered, then in an embodiment the current (previous) texture filtering operation is sent for processing, and, where there are texture filtering operations in the set remaining to be considered, a new "merged" sequence of texture filtering operations is (attempted to be) started), by determining whether a next texture filtering operation can be merged with the texture filtering operation that could not be merged with the previous texture filtering operation (and so on, until all the texture filtering operations in the set for the overall texture output in question have been considered).

In these embodiments, the texture filtering operations are in an embodiment considered (one after another) in a particular, in an embodiment selected, in an embodiment predetermined, in an embodiment sequential, order, such as, and in an embodiment, in a linear order. For example, and in an embodiment, for anisotropic filtering, the bilinear filtering operations are in an embodiment considered in a linear order along the anisotropy direction, e.g., and in an embodiment, starting at one end of the anisotropy vector (sequence of samples).

When the merging process identifies a texture filtering operation to be performed (whether a merged operation or an "original" operation), the texture filtering process (the texture filtering circuit) is in an embodiment triggered to perform, and performs, the desired texture filtering operation. As part of this processing, the necessary texture data elements (values) are in an embodiment also fetched for provision to the texture filtering process (circuit).

The texture data elements may be fetched for provision to the texture filtering operation (texture filtering circuit) in any appropriate and desired manner, such as, and in an embodiment, in the normal manner for the graphics processor and graphics (data) processing system in question.

The texture data elements (values) may be fetched from an, e.g. main, memory or for accessible to the graphics processor (e.g. of the overall data processing system that the graphics processing system is part of), or an appropriate cache of or accessible to the graphics processor and texture mapping process (unit), such as a texture cache or other cache of a cache hierarchy intermediate the graphics processor and the (main) memory system (e.g. where the required texture data element(s) is already present in the cache and so does not need to be fetched from the memory system itself).

The graphics processor (and texture mapping unit) correspondingly in an embodiment comprises a texture data element (texel) fetching circuit, that is operable to and configured to fetch texture data elements (values) for provision to the texture filtering circuit, with the texture filtering operation merging circuit in an embodiment controlling the texture data element fetching circuit to fetch the appropriate texture data elements (texels) for provision to (and to provide the texture data elements to) the texture filtering circuit.

Once the texels (texel values) have been provided to the texture filtering process/circuit, the texture filtering process/circuit can and will perform the required texture filtering operation.

The texture filtering circuit of the texture mapper can comprise any desired and suitable processing circuit operable to perform the required filtering functions.

In embodiments, the texture filtering circuit is operable to perform, and can perform, a number of different filtering operations, such as bilinear, trilinear and anisotropic filtering (e.g. with a texturing request then indicating which filtering operation is to be performed for the texture sampling operation in question).

The texture filtering circuit/process is in an embodiment also operable to (configured to), where necessary, calculate (e.g. internally) a set of contribution (interpolation) weight values to be used for a texture filtering (sampling) operation (and to then perform the texture filtering operation using the set of calculated interpolation weight values and a set of fetched texture data values).

The texture filtering process/circuit will perform the indicated texture filtering operations.

In the case where plural texture filtering operations that are each part of and to be used for an overall texture sampling operation, such as an anisotropic filtering operation, are performed separately, the texture filtering process and circuit in an embodiment also operates to (and is configured to) use (combine) the respective output filtered texture values for each texture filtering operation appropriately, to provide an (the) overall output sampled texture value for use.

The texture filtering circuit may then return the overall output sampled texture value to the graphics processor (e.g. the renderer/fragment shader) for use, for example to apply the determined output sampled texture value to a sampling position of the output being rendered.

As well as the texture filtering circuit, the texture filtering operation merging circuit (and the texture data fetching circuit), the texture mapping unit can otherwise include any suitable and desired circuits, units and stages for performing texture mapping operations (and that a texture mapper may otherwise include).

For example, in an embodiment, the texture mapper comprises a "parking" buffer, that comprises (maintains) a record of pending (outstanding) texture filtering operations to be performed (e.g. that may be waiting to be (potentially) merged).

The texture mapper thus in an embodiment also comprises a coordinate computation circuit that is operable to determine the texel positions (the texel indices) in a texture to be sampled for a texture sampling operation from the coordinates of the position in the texture that is to be sampled (and the type of texture sampling operation to be performed (e.g. whether it is an anisotropic sampling operation)).

The texture mapper is in an embodiment also operable to (configured to) calculate sets of contribution (interpolation) weight values to be used for texture filtering/sampling operations.

The coordinate and weights computation is in an embodiment performed before the merging determination (the texture filtering operation merging circuit) (as, as discussed above, the merging operation in an embodiment uses the texel positions and weights to determine whether texture filtering operations can be merged).

The texture mapper may also, and in an embodiment does also, comprise an appropriate anisotropic filtering parameter determination circuit/stage, and a stage/circuit for generating (spawning) appropriate texture filtering operations when anisotropically sampling a texture.

The overall texture sampling operation that is being performed may be triggered in any suitable and desired manner, such as, and in an embodiment, in the normal manner for the graphics processor and graphics (data) processing system in question.

For example, the graphics processor may include a programmable fragment shader (circuit (core)) operable to execute graphics fragment shading programs to perform fragment shading operations, with the fragment shader being operable to, when it encounters a graphics texturing instruction in a fragment shader program that it is executing, request the texture mapper to perform the required texture sampling operation(s).

The technology described herein also extends to the texture mapper per se.

Thus, a further embodiment of the technology described herein comprises a texture mapping apparatus operable to perform graphics texturing operations, the texture mapping apparatus comprising:

a texture mapping unit configured to sample textures to provide output sampled texture values for use when rendering an output, each sampled texture comprising an array of texture data elements, each texture data element having an associated texture value;

wherein the texture mapping unit comprises:

a texture filtering circuit configured to perform texture filtering operations, each texture filtering operation using a set of one or more texture data elements from a texture to provide a corresponding output filtered texture value; and a texture filtering operation "merging" circuit configured to, when the texture mapping unit is to perform a texture sampling operation that uses the results of plural texture filtering operations to provide an overall output sampled texture value, each texture filtering operation using a set of one or more texture data elements from the texture being sampled to provide a corresponding output filtered texture value:

determine whether a texture filtering operation in the set of plural texture filtering operations to be performed to provide the overall output sampled texture value can be at least partially merged with another texture filtering operation in the set of texture filtering operations to be performed to provide the overall output sampled texture value;

and when it is determined that a texture filtering operation in the set of plural texture filtering operations to be performed to provide the overall output sampled texture value can be at least partially merged with another texture filtering operation in the set of texture filtering operations to be performed to provide the overall output sampled texture value, cause the texture filtering circuit to:

perform a merged texture filtering operation for the two texture filtering operations; and use the result of the merged texture filtering operation when providing the overall output sampled texture value.

As will be appreciated by those skilled in the art, these embodiments of the technology described herein can and in an embodiment do comprise any one or more or all of the features of the technology described herein described herein, as appropriate.

The graphics processor and texture mapping apparatus of the technology described herein may be, and typically will be, part of an overall graphics and/or data processing system. Thus, the technology described herein also extends to a data or graphics processing system having a graphics processor and/or texture mapping apparatus as described herein.

The data or graphics processing system may comprise the memory or memories referred to herein, which may be external to the graphics processor and texture mapping apparatus. As discussed above, the memory or memories may be operable to store, and may store, a set of texture maps to be used in the texturing operations.

The graphics processor may execute any one or more or all of the processing stages that a graphics processing pipeline can normally include. Thus, for example, the graphics processor may execute and include a primitive setup stage, a rasteriser and/or a renderer. In an embodiment, the renderer may be in the form of or include a programmable fragment shader.

The graphics processor (processing pipeline) may comprise one or more programmable shading stages, such as one or more or all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc.

The technology described herein can be used in and with any suitable and desired graphics processing system and processor. The technology described herein is particularly suitable for use with tiled renderers (tile-based graphics processing systems). Thus, in one embodiment, the graphics processor (processing pipeline) is a tiled-based graphics processor (processing pipeline).

Thus, as will be appreciated, embodiments may be implemented in a data processing system comprising a memory and a graphics processing unit (GPU) (a graphics processor) comprising a texture mapping apparatus as described herein. In an embodiment, the data processing system may further include a host processor that executes applications that can require data or graphics processing by the graphics processor and that instruct the graphics processor accordingly (e.g. via a driver for the graphics processor). The system may further include appropriate storage (e.g. memory), caches, etc.

The graphics processing system and/or graphics processor and/or texture mapping apparatus may also comprise, and/or be in communication with, one or more memories and/or memory devices that store the data described herein, and/or that store software for performing the processes described herein. The graphics processing system and/or graphics processor and/or texture mapping apparatus may also be in communication with a host microprocessor, and/or with a display for displaying images based on the data generated.

The technology described herein can be used for any form of texture data. Thus it can be used where the textures represent appropriate colour values (e.g. RGB values) (and in one embodiment this is the case), such as images, but also in the case where the texture data represents other graphics processing parameters and data that may be used when generating a render output, such depth values, etc., or, indeed, non-graphics data (that is still to be processed using the graphics texture mapping operation).

Correspondingly, the technology described herein can be used for any form of output that a graphics texture mapper and graphics processor may be used to generate. In one embodiment it is used when a graphics processor is being used to generate frames (images) for display, but it can be used for any other form of graphics processing output, such as (e.g. post-processed) graphics textures in a render-to-texture operation, etc., that a graphics processor may produce, as desired. It can also be used when a texture mapper, graphics processor, etc., is being used to generate other (e.g. non-image or non-graphics) outputs.

In one embodiment, the various functions of the technology described herein are carried out on a single data or graphics processing platform that generates and outputs the required data, such as processed image data that is, e.g., written to a frame buffer for a display device.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of texture mapping in a graphics processor in a data processing system.

FIG. 1 shows an exemplary data processing system in which the technology described herein and the present embodiments may be implemented.

Figure 3:
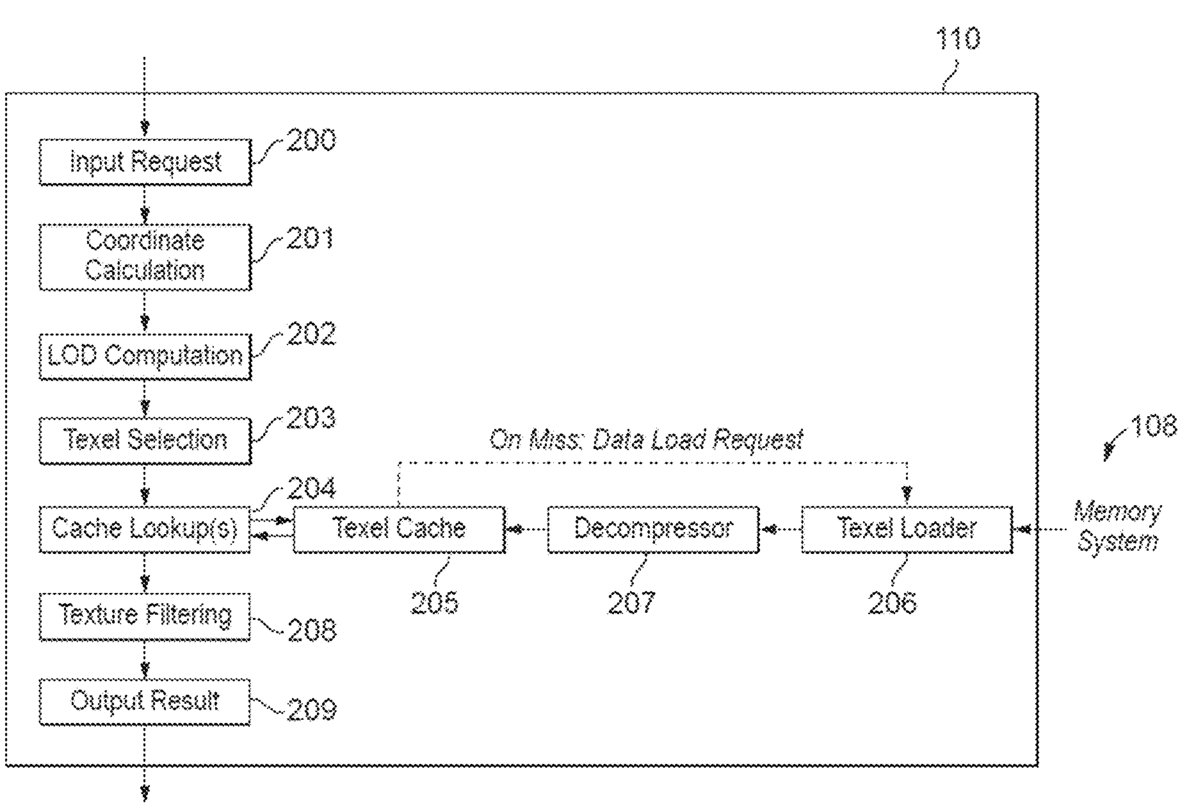
FIG. 3 shows schematically an exemplary graphics texture mapper in more detail.

The exemplary data processing system shown in FIG. 1 comprises a host processor comprising a central processing unit (CPU) 57, a graphics processor (GPU) 100, a video codec 51, a display controller 55, and a memory controller 58. As shown in FIG. 3, these units communicate via an interconnect 59 and have access to off-chip memory 20. In this system the GPU 100, video codec 51, and/or a CPU 57 will generate frames (images) to be displayed, and the display controller 55 will then provide the frames to a display 54 for display.

In use of this system, an application 60, such as a game, executing on the host processor (CPU) 57, will, for example, require the display of frames on the display 54. To do this, the application 60 will submit appropriate commands and data to a driver 61 for the graphics processor 100 that is executing on the CPU 57. The driver 61 will then generate appropriate commands and data to cause the graphics processor 100 to render appropriate frames for display and to store those frames in appropriate frame buffers, e.g. in the main memory 20. The display controller 55 will then read those frames into a buffer for the display from where they are then read out and displayed on the display panel of the display 54.

Figure 2:
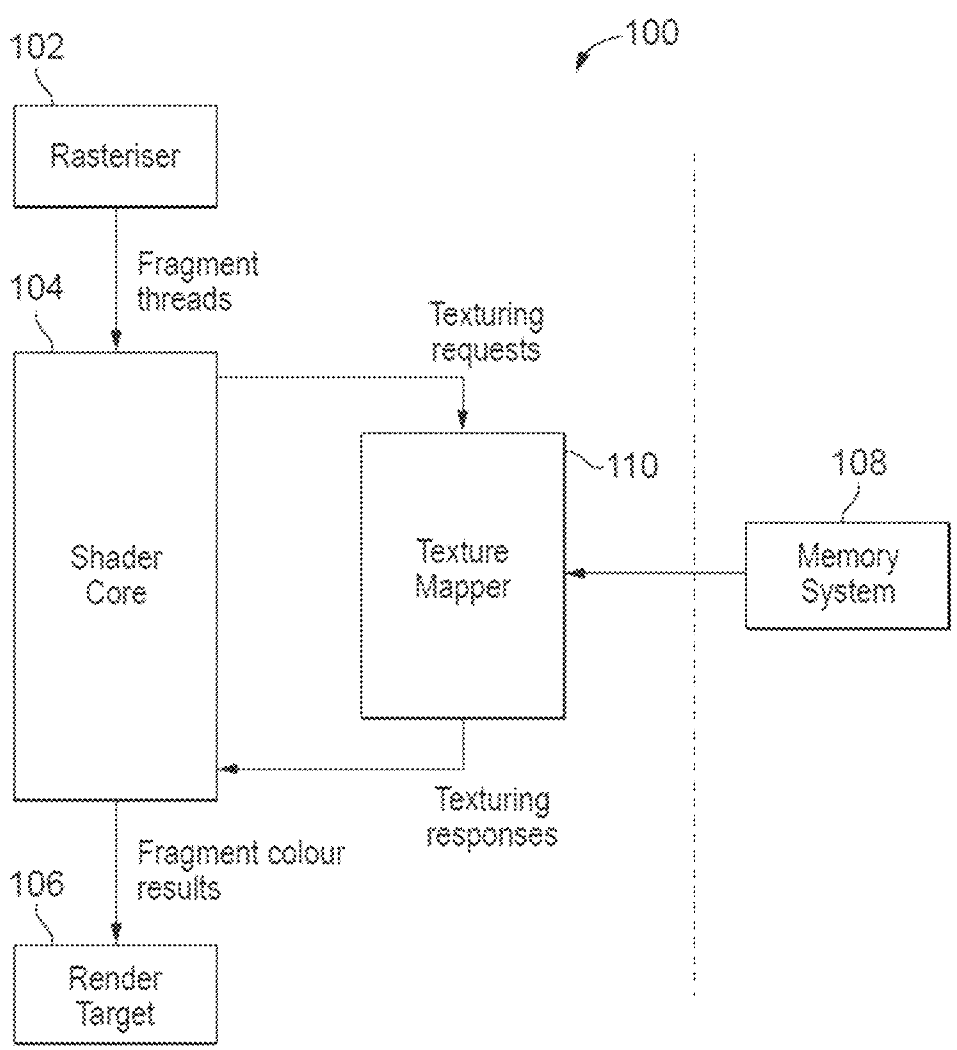
FIG. 2 shows schematically a graphics processor that includes a texture mapper.

FIG. 1 shows an exemplary graphics processor (graphics processing unit (GPU)) 100 that can perform texture mapping, that can be used in the data processing system of FIG. 2.

As shown in FIG. 2, the GPU 100 comprises data processing circuitry (circuits) that implements a graphics processing pipeline. The pipeline includes, inter alia, a rasterizer 102 and a renderer in the form of a programmable (fragment) shader core 104. The pipeline uses a buffer 106 (e.g. in external memory 108) for storing an output array (e.g. frame or image to be displayed).

The GPU 100 further comprises a texture mapper 110, and the memory 108 will also store, inter alia, graphics textures to be used by the GPU 100 when performing texture mapping operations.

In this system, the rasterizer 102 will rasterize input primitives into individual graphics fragments for processing. To do this, the rasterizer 102 rasterizes the primitives to sampling positions representing the render output, and generates graphics fragments representing appropriate sampling positions for rendering the primitives. Each fragment may represent a single sampling position or a set of plural sampling positions. The fragments generated by the rasterizer 102 are then sent onwards to the fragment shader (renderer) 104 for shading.

The fragment shader 104 executes shader programs for the fragments issued by the rasterizer 102 in order to render (shade) the fragments. The fragments are processed using execution threads in the shader core, with the threads executing the shader program(s) that are to be used to process the fragments. A thread is executed for each sampling position that is to be shaded.

A shader program may include texturing instructions for texture mapping operations that are required to be executed by the texture mapper 110.

When a texturing instruction is encountered by the fragment shader 104, a texturing instruction is sent from the fragment shader 104 to the texture mapper 110, requesting the texture mapper 110 to perform a texturing operation.

When requested by the fragment shader 104 to perform a texture mapping operation, the texture mapper 110 reads textures from the memory 108 (as required), performs the texture mapping operation, and returns a (e.g. RGB colour) value sampled from the texture back to the fragment shader 104, for use when shading the fragment and sampling position(s) in question.

The "shaded" fragment sampling positions from the fragment shader 104 are then stored as part of the output render target in the buffer 106, e.g. in the memory 108, e.g. for subsequent post-processing or display.

FIG. 3 shows an exemplary texture mapper (texture mapping apparatus/unit) 110 in more detail.

As shown in FIG. 3, the texture mapper 110 includes a number of processing stages (circuits), including an input request stage (circuit) 200 that accepts texture mapping operation requests from a renderer (e.g. the fragment shader 104 in FIG. 2). This is followed by a coordinate calculation stage (circuit) 201 that, for example, will convert an arbitrary coordinate included with a texture mapping operation request into an appropriate canonical coordinate between 0.0 and 1.0 to be used when sampling the texture.

There is then a level of detail (LOD) computation stage (circuit) 202, that can determine the level of detail at which the texture is to be sampled for the texture mapping operation (this selects the mipmap levels to use and how to filter between them in the case where the texture is in the form of mipmaps). This level of detail computation may not be necessary, for example where the fragment shader program itself can explicitly indicate the level of detail to be used, or a texture is not stored in the form of mipmaps.

There is then a texel selection stage (circuit) 203, which uses the coordinate determined by the coordinate calculation stage 201 to determine the actual texels (texture data elements) in the texture (and, if appropriate, the determined mipmap levels in the texture) to be used for the texture mapping operation.

The required texels (their data) are then fetched by a cache lookup stage (circuit) 204.

As shown in FIG. 3, although the texture data will be stored in the memory system 108, when that texture data is needed by the texture mapper 110, the texture data required for the texturing operation will be fetched from the memory 108 where it is stored, and first loaded into a texture cache 205 of or accessible to the texture mapper 110, with the texture mapper 110 then reading the texture data (by the cache lookup circuit 204) from the texel cache 205 for use.

As shown in FIG. 3, the texture mapper 110 may accordingly comprise a texel loader (a texel loading circuit) 206 that is operable to load data of texels from textures stored in the memory 108 for storing in the texel cache 205. There may also be a decompressor (decoder) stage (circuit) 207 that can decompress (decode) textures that are stored in a compressed (encoded) format in the memory system 108 before storing the texel values in the texel cache 205.

Once the required texels (texel data values) have been fetched from the texel cache 205, they are used in the required texture filtering operation by a texture filtering stage (circuit) 208 to generate an appropriate output result for the texture position (coordinate) being sampled, which output result is then appropriately packaged and returned to the fragment shader by an output result stage (circuit) 209. The texture filtering circuit 208 may, for example, perform any desired form of filtering using the fetched texel values, such as bilinear, trilinear, anisotropic, or any other form of filtering, to generate the desired filtered sample result.

The present embodiments relate in particular to the case where the texture mapper 110 is to perform anisotropic filtering to sample a texture.

Figure 4:
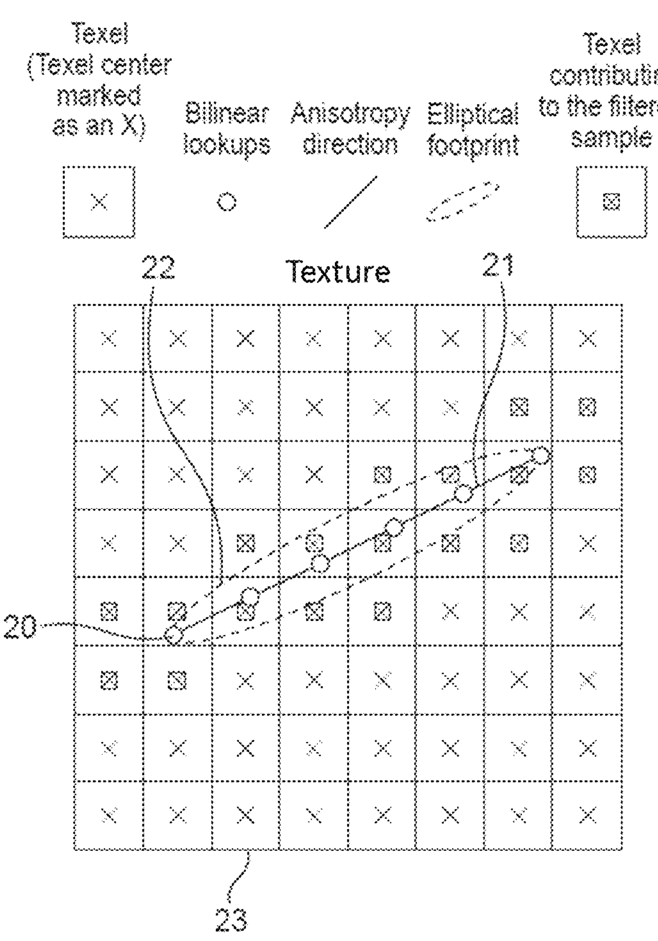
FIG. 4 shows an example of anisotropically sampling two mipmap levels for a texture.

In this case, as shown in FIG. 4, when performing "anisotropic filtering", multiple, e.g. bilinear, filtered samples are taken along a line in the texture (typically referred to as the anisotropy direction), which line (anisotropy direction) is intended to correspond to the major axis of the "ellipse" (the elliptical footprint) that corresponds to the projection of the circular pixel (that the sampling point represents) onto the (3D) surface that the texture is to be applied to. The multiple samples taken along the line (anisotropy direction) are centred on the texture coordinate to be sampled (which will be the centre of the ellipse).

The plural, e.g. bilinear, filtered samples taken along the anisotropy direction are then appropriately combined, e.g. using a weighted average, e.g. based on their distance along the anisotropy direction from the centre of the projected "ellipse" (from the texture coordinate being sampled), to provide the overall output sampled texture value that is returned and used for texturing the sampling point in question.

FIG. 4 illustrates this and shows the taking of plural (in this case six) bilinearly filtered texture samples 20 along an anisotropy direction 21 corresponding to the major axis of an "ellipse" 22 corresponding to the projection in the texture of the sampling position onto the surface to which the texture is to be applied. The individual bilinear filtering results are then appropriately combined to give the final output sampled texture value.

Figure 5:
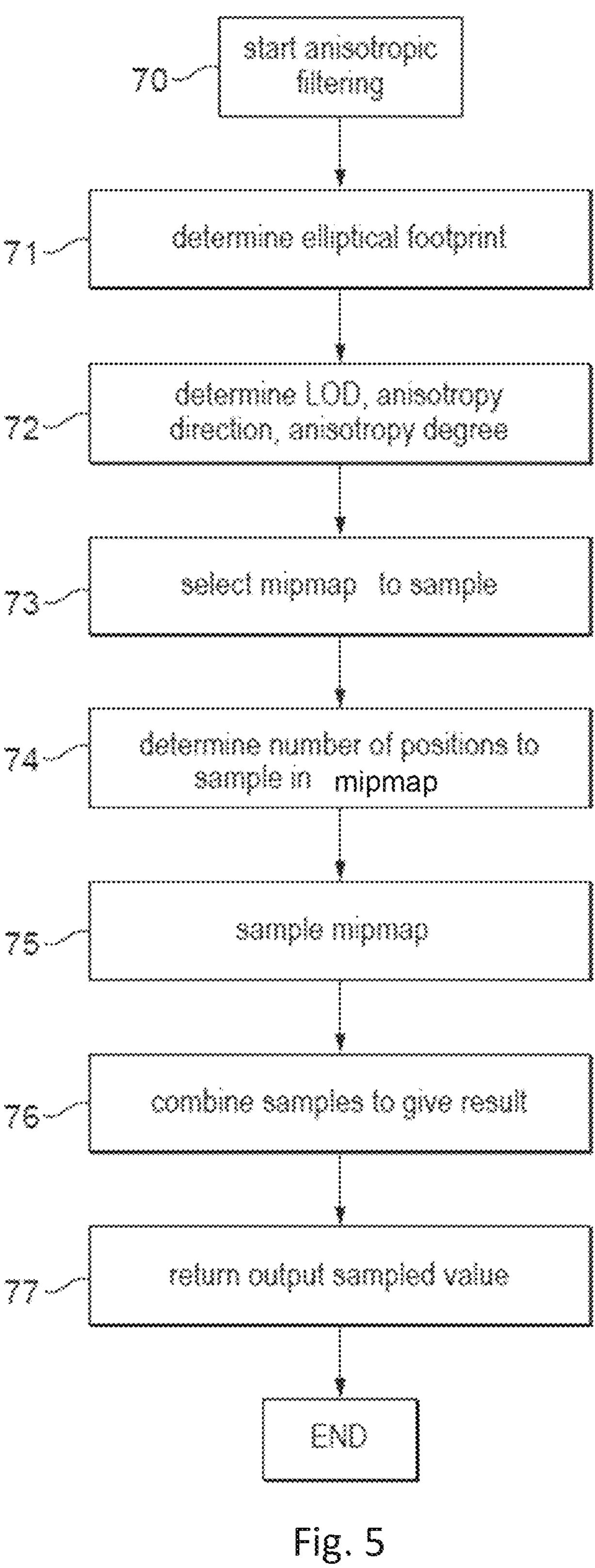
FIG. 5 is a flowchart showing anisotropic filtering in an embodiment of the technology described herein.

FIG. 5 shows the basic operation of the texture mapper 110 when performing anisotropic filtering of a texture in an embodiment.

As shown in FIG. 5, when anisotropic filtering is to be performed (step 70), the texture mapper will first determine the appropriate parameters for the elliptical footprint that, in effect, corresponds to the projection of the sampling point onto the surface to which the texture is being applied (step 71). This may be done in any suitable and desired manner.

The determined elliptical footprint (the parameters for the ellipse) is then used to determine a level of detail (LOD) at which to sample the texture, the anisotropy direction along which the texture will be sampled, and an "anisotropy degree", which represents a number of positions to sample along the anisotropy direction in the texture (step 72). Again, this may be done in any suitable and desired manner.

Once the level of detail at which to sample the texture, the anisotropy direction, and anisotropy degree have been determined, the mipmap to sample for the texture is selected (step 73).

The mipmap to sample is selected in accordance with the level of detail at which the texture is to be sampled, and, in the present embodiments, in the case of a fractional level of detail, will correspond to a mipmap level that is more detailed (i.e. comprises a higher resolution version of the texture) than the determined level of detail.

It is then determined how many positions should be sampled in the mipmap (step 74).

The number of positions that are sampled in the mipmap could be determined simply as (as equal to) the anisotropy degree determined from the ellipse parameters or it could be based on that determined anisotropy degree, but with some potential modification(s). For example, the number of positions to sample could be determined based on both a determined "base" number of positions to sample (i.e. a "base" anisotropy degree) determined from the ellipse parameters, and the level of detail at which the texture is being sampled.

Once the number of positions along the anisotropy direction for which samples should be taken has been determined, bilinearly filtered samples for the determined number of positions are then taken in the selected mipmap (step 75).

As illustrated in FIG. 4, in the present embodiments the positions that are sampled are spaced one texel apart along the anisotropy direction (along the length of the major axis of the projected elliptical footprint) in the texture. In this embodiment, a single bilinearly filtered sample is taken at each position along the anisotropy direction that is to be sampled. (However, it would be possible to take plural (e.g. bilinear) samples for each position along the anisotropy direction (e.g. to "supersample" at each position to be sampled), if desired.)

It will be appreciated that in this embodiment, it may be determined that samples should be taken for a non-integer number of positions in the mipmap level. In such a case, the number of positions to sample could simply be rounded to the nearest integer (or the nearest highest integer, or the nearest lowest integer, as desired.)

However, in the case where the texture mapper supports taking fractional samples from a texture, then that operation is in an embodiment used to take samples for the desired non-integer number of positions in the mipmap level in question.

Once the bilinearly filtered samples in the selected mipmap level have been taken, then those filtered samples are used (combined) to provide an overall output sampled texture value for use by the (fragment shader of the) graphics processor (step 76).

In the present embodiment, the bilinearly filtered samples taken in the mipmap level are combined appropriately, according to the determined sample count (number of positions to be sampled) in the mipmap level in question, to provide a combined overall output sampled texture value.

Thus, a weighted average of the bilinear filtering samples is generated (based on the distances of the samples (positions) along the anisotropy direction from the centre of the major axis of the projected ellipse).

Then, the resulting value for the mipmap level is linearly interpolated according to the fractional LOD value (i.e. based on the distance of the mipmap level in question from the actual level of detail that it was desired to sample the texture at), to provide the final, overall output sampled texture value.

In general the weighting of the bilinear filtering samples based on their distance from the centre of the projected ellipse could follow, e.g., a linear function with distance from the centre of the ellipse, or more sophisticated functions (weight distributions) could be used, such as following a Gaussian function or some approximation of a Gaussian function, etc.

Other arrangements would, of course, be possible.

Once the overall output sampled texture value has been determined, that value is returned to the fragment shader for use (step 77).

As discussed above, the technology described herein and the present embodiments relate in particular to the merging of individual texture filtering operations (e.g. bilinear filtering operations), for example when performing anisotropic filtering as described above.

FIGS. 6 to 13 illustrate this.

Figure 6:
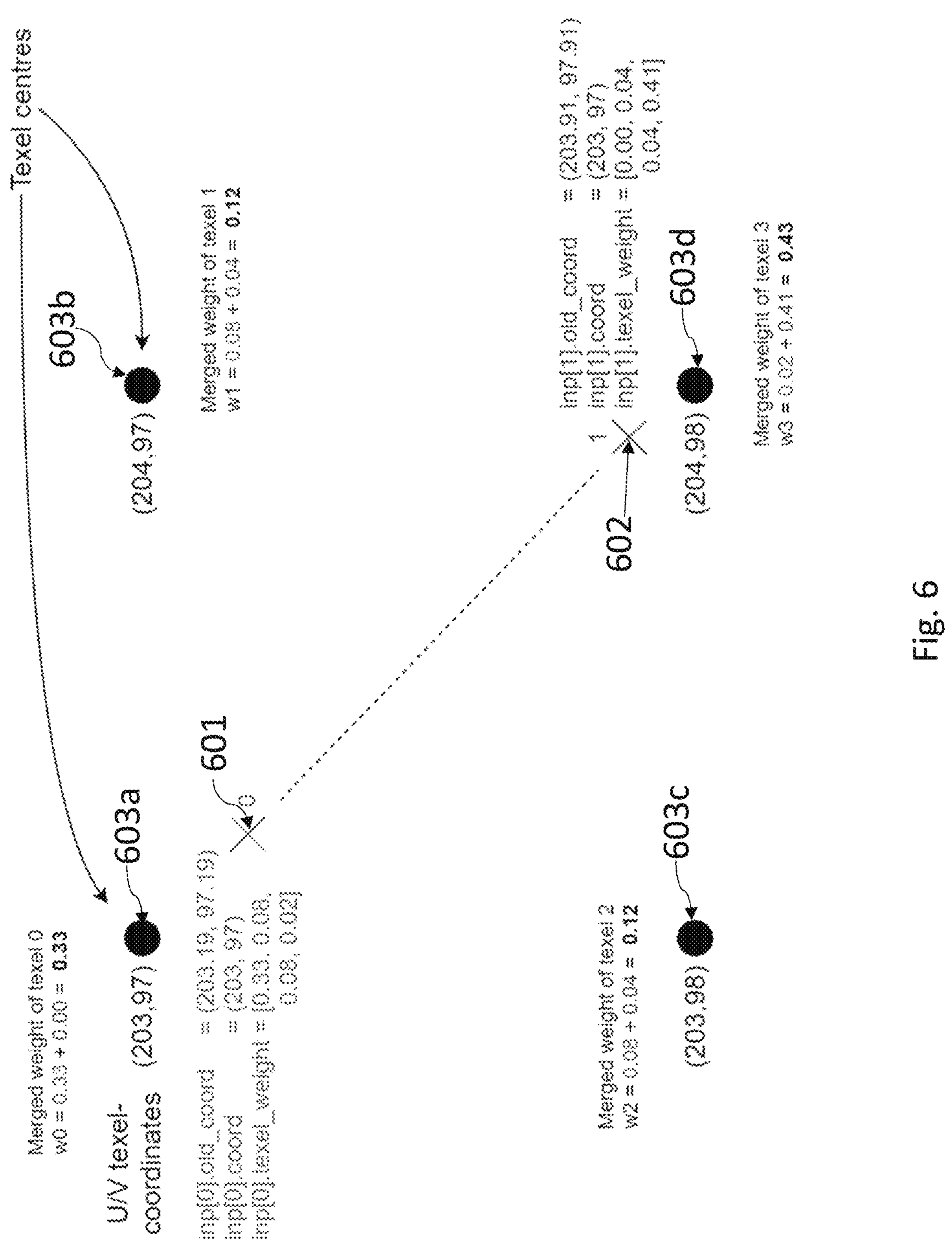
FIG. 6 shows an example of two texture filtering operations sampling the same texture data elements.

FIG. 6 shows an illustrative example of merging individual texture filtering operations in the context of two bilinear filtering operations sharing the same four texels.

FIG. 6 shows two individual bilinear texture filtering operations of an anisotropic filtering operation, sampling respective positions 601 and 602 in a texture, wherein each individual texture filtering operation makes use of the same four texels 603*a*, 603*b*, 603*c*, and 603*d*.

The individual texture filtering operations 601 and 602 are conventionally processed separately, as discussed above. However, these texture filtering operations can be merged in accordance with the technology described herein, as texture filtering operations 601 and 602 make use of the same four texels in their respective bilinear filtering operations.

In FIG. 6, the merging of the two texture filtering operations 601 and 602 is done by first determining the respective weighting of each texel for each individual texture filtering operation, and subsequently summing the respective weightings of each texel for the individual texture filtering operations 601, 602 to obtain the weightings of each texel for the merged texture filtering operation.

This operation can, and in this embodiment does, account for the respective "anisotropic pass" weight of each individual bilinear filtering operation (its contribution to the overall anisotropic filtering (sampling) operation)) to give an adjusted set of texel weights for each individual bilinear filtering operation before summing those respective adjusted weights.

In this embodiment, the adjusted set of weights for each individual bilinear filtering operation is calculated by multiplying the anisotropic pass weight of a respective bilinear filtering operation with its respective set of bilinear weights.

The bilinear weightings of each texel for each individual texture filtering operation can be determined in any desired manner, but in the present embodiment, and as shown in FIG. 6, the bilinear weights are determined for each individual texture filtering operation in the conventional manner for bilinear filtering (i.e. based on the distance of the texel from the position that is actually being sampled).

For instance, each individual texture filtering operation will have a set of coordinates (u,v) within the texture map, and these coordinates often fall within a set of four texels, where the coordinates (indices) of the top-left texel of the texture filtering operation is given by (i, j)=(floor(u), floor (v)) and the coordinates of each other texel in the quad of texels associated with the texture filtering operation can be calculated by appropriately adding +1 to one or both of the components of (i, j) (As such, in an embodiment texels are typically at integer coordinates of the texture sample). The fractional part of the coordinates (the decimal portion of the coordinate) (i.e. the distance of the texture filtering operation in question from the top-left texel (in the vertical and horizontal directions) as a fraction of the distance between two adjacent, axis-aligned texels (which is defined as 1.0)) is given by (frac_u, frac_v)=(u, v)−(i, j).

Accordingly, the bilinear weights for each texel of a bilinear texture filtering operation is given by:

$$W\_0 = (1 - frac\_u) * (1 - frac\_v);$$

$$W\_1 = frac\_u * (1 - frac\_v);$$

$$W\_2 = (1 - frac\_u) * frac\_v;$$

$$W\_3 = frac\_u * frac\_v;$$

where W_0 is the weight of the top-left texel, W_1 is the weight of the top-right texel, W_2 is the weight of the bottom-left texel, and W_3 is the weight of the bottom right texel.

In the example of FIG. 6, individual texture filtering operation 601 has coordinates (203.19, 97.19), meaning the top-left texel has coordinates (203, 97), the fractional part is (0.19, 0.19) and so the bilinear texel weights for the individual texture filtering operation 601 are calculated to be (approximately) 0.66, 0.155, 0.155, and 0.036 for texels 603*a*-603*d*, respectively. Thus, taking account of the anisotropic weight of 0.5 for texture filtering operation 601, the adjusted weights are calculated to be (approximately) 0.33, 0.08, 0.08, and 0.02 for texels 603*a*-603*d*, respectively.

Similarly, individual texture filtering operation 602 has coordinates (203.91, 97.91) and a fractional part of (0.91, 0.91) and so the bilinear texel weights for the individual texture filtering operation 602 are (approximately) 0.008, 0.08, 0.08, and 0.828 for texels 603*a*-603*d*, respectively. Thus, taking account of the anisotropic weight of 0.5 for texture filtering operation 602, the adjusted weights are calculated to be (approximately) 0.00, 0.04, 0.04, and 0.41 for texels 603*a*-603*d*, respectively.

Hence, summing these respective adjusted weightings gives the merged texel weightings of 0.33, 0.12, 0.12, and 0.43 for texels 603*a*-603*d*, respectively.

The merged texel weightings of FIG. 6 can then be used for the merged texture filtering operation in a similar (the same) manner to steps 76 and 77 of FIG. 5.

If at least the fractional parts frac_u or frac_v (the fractional part associated with the horizontal or vertical direction between texels) were equal to zero (or one), then the texture filtering operation associated with that fractional part would lie on an axis-aligned line between two texels that it samples from, meaning the weights of the texels not on that axis may be near zero (at zero) and those texels would not effectively contribute to the output of the individual texture filtering operation.

If the two texture filtering operations do not share exactly the same set of texels but they are adjacent and share a pair of texels then they may still be able to be merged.

For example, considering two texture filtering operations, one requiring a set of texels to the left of the other (and sharing two of those texels), for the right-most individual texture filtering operation, if at least frac_u is equal to zero then the texels that actually contribute to the output of that right-most texture filtering operation would still be shared by the left texture filtering operation and so there is a single set of texels shared by both texture filtering operations that contributes to the output of both texture filtering operations meaning that they can be merged similarly to what is described in FIG. 6.

Other arrangements would also be possible.

Figure 7:
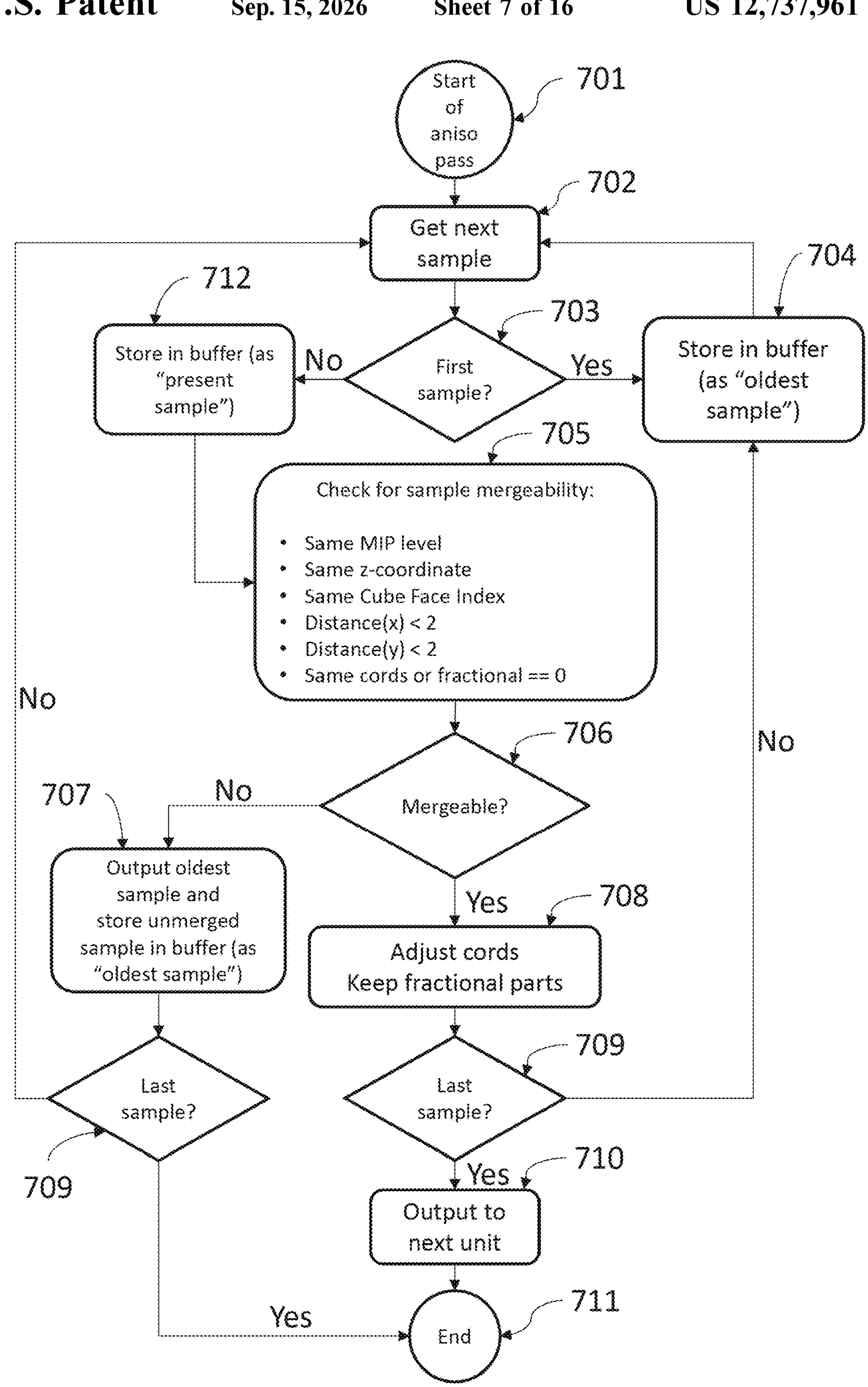
FIG. 7 is a flowchart showing the merging process an embodiment.

FIG. 7 is a flow-chart showing a first embodiment of merging individual texture filtering operations in accordance with the technology described herein in the context of anisotropic filtering. The operation of FIG. 7 can for example be used in the example described with regard to FIG. 6 to merge individual texture filtering operations.

The operation starts with the initialisation of the anisotropic filtering pass (step 701), which initialises the number of individual texture filtering operations required for the anisotropic pass as well as their positions within an anisotropic ellipse of the anisotropic pass and the anisotropic direction.

The next sample (i.e. texture filtering operation) of the filtering pass is then obtained (step 702).

If the sample that was obtained in step 702 was the first sample to be obtained (step 703—Yes) then the sample is subsequently stored in a "parking" buffer associated with the anisotropic filtering pass (step 704). In particular, the sample is stored as "the oldest sample" (i.e. the oldest sample that has been considered and not output to the next unit in the texture filtering pipeline (discussed below) up to that point in the operation). The operation continues to obtain the next sample (step 702).

If, however, the sample obtained in step 702 was not the first sample to have been obtained in the anisotropic filtering pass (step 703—No), then the process continues on to store the sample in the buffer, in particular as a "present sample" (i.e. the sample that is being considered for mergeability with the oldest sample).

The process proceeds to check whether the samples that have been obtained thus far (i.e. the ones stored in the buffer as the "oldest sample" and the "present sample") are compatible with being merged (step 705).

When determining whether those samples are compatible with being merged, a number of checks are performed on the samples in question (step 705), including a number of "precursor" checks to eliminate samples that cannot be merged.

That is, in this embodiment, it is checked whether the samples (texture filtering operations) that are being considered for mergeability sample the same texture "surface", as if they do not sample the same texture surface then they cannot be merged as they will share none of the same texels and hence none of the same texture data. In particular, it is determined whether:

- the samples that are being considered for mergeability sample the same mipmap level (in the case of a texture stored in the form of a mipmap), as if the samples were not sampling from the same level of a mipmap texture then the samples could be sampling from a texture at differing levels of detail, with differing texels, and thus may not be mergeable according to this embodiment;
- the samples that are being considered for mergeability have the same depth (z-coordinate) (in the case of sampling a three-dimensional texture (i.e. a texture with depth)), as if the samples (texture filtering operations) sampled the same texture but at different depths then the texels would be incompatible with merging as the samples (texture filtering operations) being considered would not share any of the same texels (the texels may share the same vertical and horizontal positions, but their depth within the texture would differ and hence they would not be the same set of texels);
- the samples that are being considered for mergeability are sampling the same cube face (in the case that the texture filtering operations operate on a cube texture), as if the samples were sampling differing cube faces then they would not share any texels from the same texture surface and would be incompatible with being merged;
- the samples that are being considered for mergeability are within a distance of 2 with regard to the x and y coordinates of the texels that they require, as if those distances exceeded this range then the samples could not share any of the same texels and hence could not be merged according to this embodiment;

If the samples satisfy the above criteria, then they are, in principle, candidates for merging and so the operation then determines whether the samples that are being considered for mergeability have the same coordinates (i.e. share the same texels) or whether the fractional parts of their coordinates are equal to zero, as appropriate.

If the samples do not share the same coordinates (texels) (and at least one of their fractional parts is not equal to zero), then, according to this embodiment, the samples cannot be merged as more than one texture filtering operation may be required to perform a (bilinear) texture filtering operation that can sample from all of those texels.

Similarly, if the fractional part of the coordinates was not zero (as discussed with regard to FIG. 6) (and the samples do not share all of the same texels) then the samples cannot be merged as more than one texture filtering operation would be required to sample from all of the required texels according to this embodiment.

In particular, if the texture filtering operations require differing (potentially adjacent (as described above)) sets of texels and one of the texture filtering operations does not have its texel weights such that the output of that respective texture filtering operation is only dependent on the texels that it shares with the other texture filtering operation then the texture filtering operations cannot be merged.

If the samples are mergeable (step 706—Yes), i.e. the samples meet all of the requirements set out in step 705, then the weightings of the texels are merged (summed with respect to each mergeable individual texture filtering operation's texel weightings), and the coordinates (texels) of the merged texture filtering operation are indicated to be (and adjusted if necessary) the coordinates (texels) that the samples being considered for mergeability (i.e. the oldest and present sample) share (that is to say, the set of texels which contributes to both outputs of the texture filtering operations that were considered) (step 708), e.g. as discussed with reference to FIG. 6 above.

Otherwise, if the samples are not mergeable (step 706—No), i.e. at least one of the requirements set out in step 705 is not met, then the oldest sample is output for processing, and the sample that was not merged (the present sample) is stored as the oldest sample in the buffer for consideration with the next, present, sample (step 707).

The sample processing is discussed below with reference to FIG. 13, but as shown in that Figure, the texel coordinates are sent to a texel fetcher, which fetches the corresponding texel (texture data elements) data, and provides them, along with the texel weights, to a texture filtering unit that performs the required texture filtering operation.

The oldest sample can be a merged sample in the case where a plurality of texture filtering operations have been merged prior to encountering a non-mergeable sample (texture filtering operation) (as discussed below), or it may be an individual texture filtering operation (e.g. in the case where two individual texture filtering operations (samples) are stored as the oldest and present samples and they cannot be merged).

In either case, it is then checked whether the final sample (texture filtering operation) in the anisotropic filtering pass has been reached (step 709), and if the final sample (texture filtering operation) has been reached, then the operation ends (step 711); otherwise the operation continues to consider, for the anisotropic pass being considered, the next sample (bilinear filtering operation) for the anisotropic pass (step 702).

In the case where the texture filtering operations were mergeable, if the final texture filtering operation has not been reached, then the merged sample is stored in the buffer (as the oldest sample) (step 704), and the operation continues to check if the next sample (that will be stored in the buffer as the present sample) can be merged with that merged sample (that is stored as the oldest sample).

If the final sample (texture filtering operation) has been reached, i.e. there are no more samples in the anisotropic filtering pass being considered, then the (final) merged sample is output to the next stage in the pipeline (step 710) for processing (as discussed above and in further detail with regard to FIG. 13), and the merging operation is complete (step 711).

The merging determination process of FIG. 7 thus operates to consider successive texture filtering operations in turn (from the set of texture filtering operations that make up the overall (anisotropic) texture sampling operation), to see if they can be merged. In this case, respective, successive pairs of texture filtering operations are considered, but the process is so as to consider whether a next texture filtering operation can be merged with a (the) previous texture filtering operation (which may itself be a merged operation) or not, with the next texture filtering operation either being merged with the previous texture filtering operation or the previous texture filtering operation being sent for processing and a new "merging" sequence being started (and so on, until all the texture filtering operations in the set have been considered).

Figure 8A:
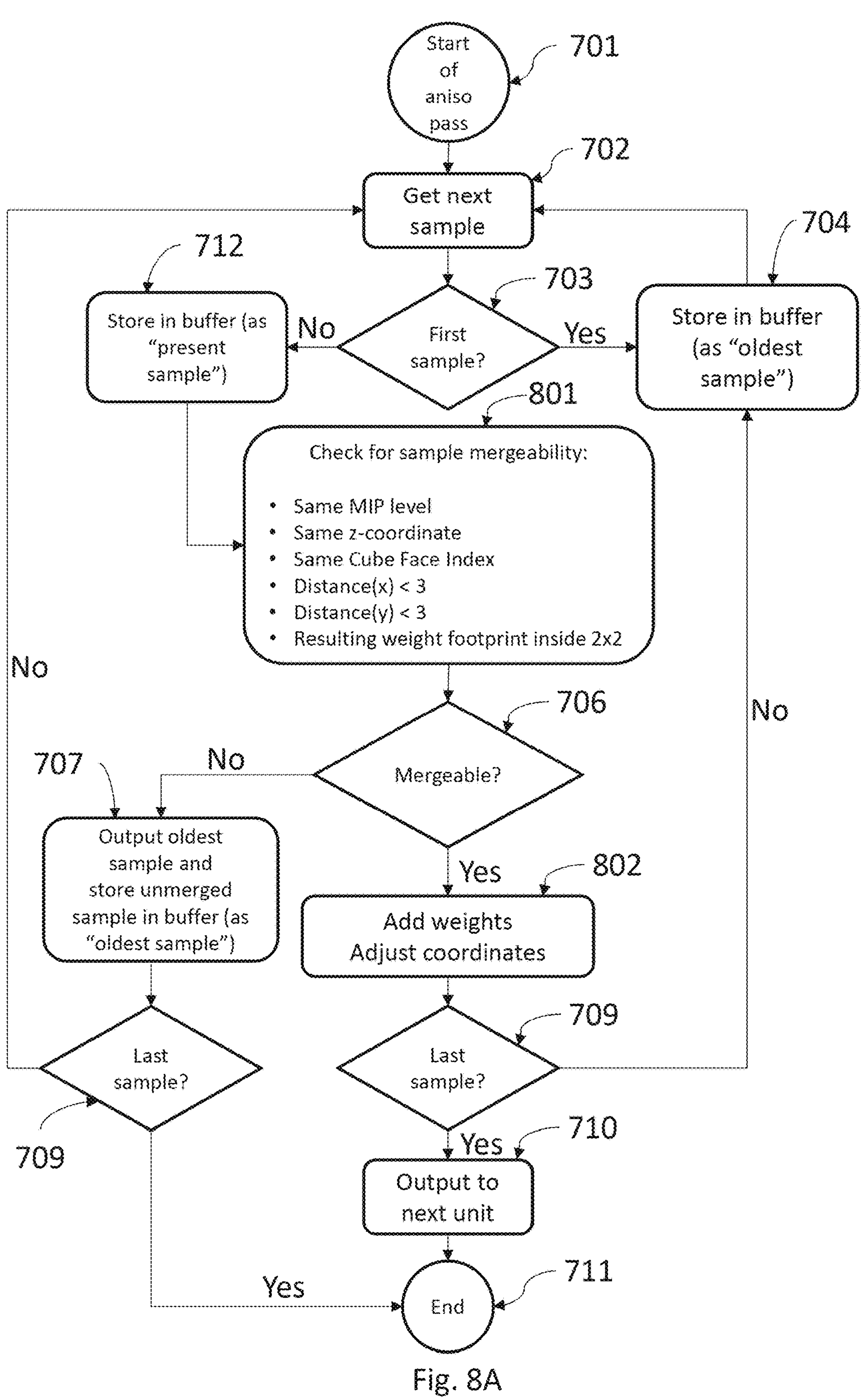
FIG. 8A is a flowchart showing the merging process an another embodiment.

FIG. 8A shows an alternative embodiment of the merging operation that can allow individual texture filtering operations to be merged even where they may not share the same set of texels.

FIG. 8A is similar to FIG. 7, sharing the same steps 701, 702, 703, 704, 706, 707, 709, 710, 711, and 712, but differs in the check for "mergeability" and the subsequent "merging" of texture filtering operations.

In FIG. 8A, when considering whether samples (texture filtering operations) are mergeable a similar set of "precursor" checks are employed to eliminate any pairs of samples that may be immediately identified as incompatible with being merged (i.e. not sampling from the same texture).

For instance, similarly to the embodiment of FIG. 7, it is considered whether: the samples (texture filtering operations) sample from the same mipmap level (in the case of a mipmap texture), have the same depth (z coordinate) (in the case that a three-dimensional texture is being sampled (i.e. a texture with depth, and are sampling the same cube face (in the case that a cube texture is being sampled).

In this embodiment, as shown in FIG. 8A, it is considered whether the samples being considered for mergeability are within a distance of 3 with regard to the x and y coordinates of the texels that they require. If the coordinates of the texels that the samples being considered require fall outside of this range then the samples do not share any of the same samples (a sample will typically require four texels). This embodiment thus recognises that the coordinates of the texels required by the respective samples can be further apart than that of the previous embodiment.

That is because even if two texture filtering operations do not use exactly the same set of texels, it could still be the case that there is, for example, a single set of texels that can be processed in a single texture filtering operation for the texture filtering operations being considered, such that there is a merged texture filtering operation that could be performed for and instead of the different texture filtering operations being considered.

For example, for some texture filtering operations, while using in principle a particular set of plural texture data elements, it could be the case that one or more of the texture data elements of the overall set of texture data elements that is to be used for the filtering operation will not actually contribute to the output of the texture filtering operation, for example because they have a contribution weight of zero for that particular instance of the texture filtering operation, and so when considered with another, further, sample the two samples may be able to be merged.

If the samples satisfy the above criteria, then they are, in principle, candidates for merging and so the operation then determines whether the texels that will actually contribute to the samples being considered are within a 2×2 quad of texels. That is to say, as a (bilinear) texture filtering operation requires four texels to sample from to provide a filtered output, if when considering the contribution weightings for the texels of the two samples it is determined that the non-zero weightings form a 2×2 quad of texels, then the two samples can be replaced by a single merged sample that uses the texels and weights indicated by that 2×2 quad.

To determine if this is the case, in the present embodiment, an array (e.g. a matrix) representing texels (in an embodiment in their relative positions in the texture) and their contribution weights for the samples being considered is generated, with the weights associated with each sample (texture filtering operation) being combined (summed) for each texel, and thus each position within the array, and the array (matrix) is then assessed to determine which texels actually contribute to the output of the filtering operations (and, where appropriate, the configuration of the contributing texture data elements). In particular, if there is a 2×2 quad of texels that contributes to the output, then the texture filtering operations are deemed to be mergeable.

Figure 8B:
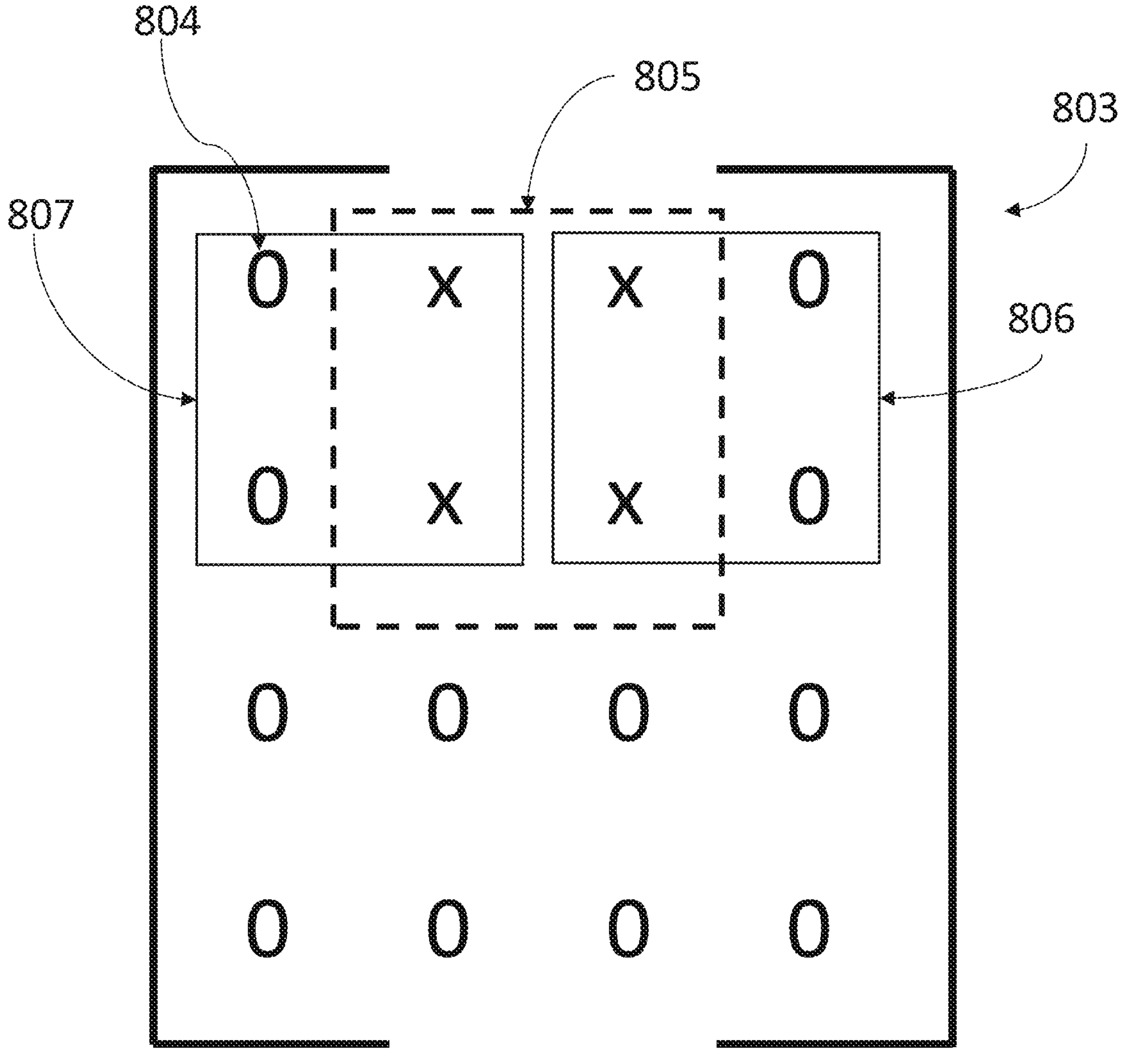
FIG. 8B shows an example array that can be used with the merging process of the embodiment of FIG. 8A.

FIG. 8B illustrates an example of determining whether the weight footprint of two respective texture filtering operations (samples) lies within a 2×2 quad.

FIG. 8B shows an exemplary array 803, which in this embodiment takes the form of a 4×4 matrix, of respective texel weightings 804 for two texture filtering operations. In this embodiment, the first texture filtering operations requires the texels and texel weights represented by 806 and the second texture filtering operation requires the texels and texel weights represented by 807. In this embodiment, some texels have a weighting of zero, which means that those respective texels do not contribute to the texture filtering operations, and there are texels with non-zero weightings (denoted as "x"), which means that those texels have some contribution to the texture filtering operation.

When considering the combined texel weights of a plurality of texture filtering operations in accordance with step 801 of FIG. 8A described above, if the combined (e.g. summed) weightings at each respective texel position from each texture filtering operation falls within a 2×2 quad, for example quad 805, then the respective texture filtering operations associated with those weightings are deemed to be mergeable (assuming the other criteria are met). Thus, the texture filtering operations that when combined produce the weightings in the quad 805 are deemed to be mergeable.

For instance, the first texture filtering operation 806 requires, in principle, contributions from the four texels that it requires. However, as can be seen in FIG. 8B, the weightings for the right-most texels that the first texture filtering operation 806 requires are zero, which means that those texels do not in practice contribute to that texture filtering operation (e.g. as the first texture filtering operation is sampling the texture close to an axis aligned line between the left-most texels that it requires meaning that the right-most texels have (nearly) no contribution to the output (this is discussed in further detail with regard to FIGS. 6 and 9)).

Similarly, for the second texture filtering operation 807, the left-most weightings for the texels of the second texture filtering operation 807 are zero.

Thus, when considering the resulting combined texel weightings, a 2×2 quad of texels 805 can be seen which is formed from the left-most weightings of the first texture filtering operation 806, and the right-most weightings of the second texture filtering operation 807.

Hence, the first and second texture filtering operations can be merged into a single texture filtering operation that uses the texels and texel weights in the 2×2 quad 805.

If, however, the combined texel weightings of the texture filtering operations do not fall within a quad then those respective texture filtering operations would not be deemed to be mergeable.

Returning to FIG. 8A, in the case that the samples being considered are mergeable, i.e. they meet the requirements of step 801, then the samples can be merged (step 802). In this embodiment, the samples are merged by summing the texel weights at the respective texels associated with the samples, and the merged texture filtering operation has its texel set (coordinates) adjusted to be associated with the resulting texel set that falls within the 2×2 quad.

FIG. 9 shows a more detailed example of merging individual texture filtering operations that may be done using the processes set out in FIGS. 7 and 8A.

Figure 9A:
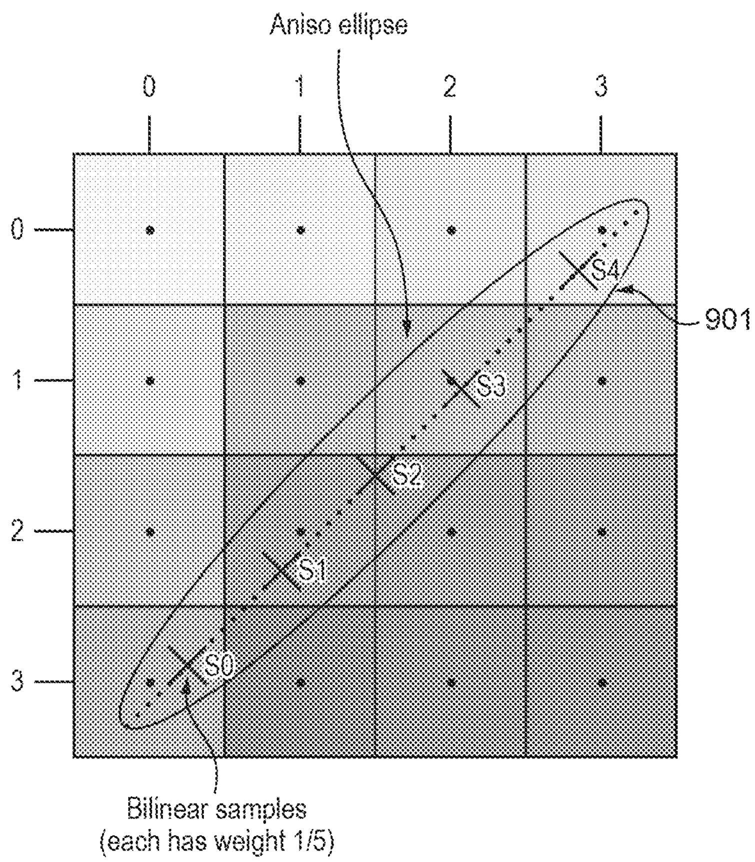
FIG. 9A shows an example of an anisotropic filtering process.

FIG. 9A shows an exemplary anisotropic filtering pass, with an anisotropic ellipse 901, and samples S0-S4 along the major axis of the ellipse. In this example, it is assumed that samples S0-S4 (corresponding to five individual texture bilinear filtering operations) are sampling the same texture "surface" and so can potentially be merged.

Figure 9B:
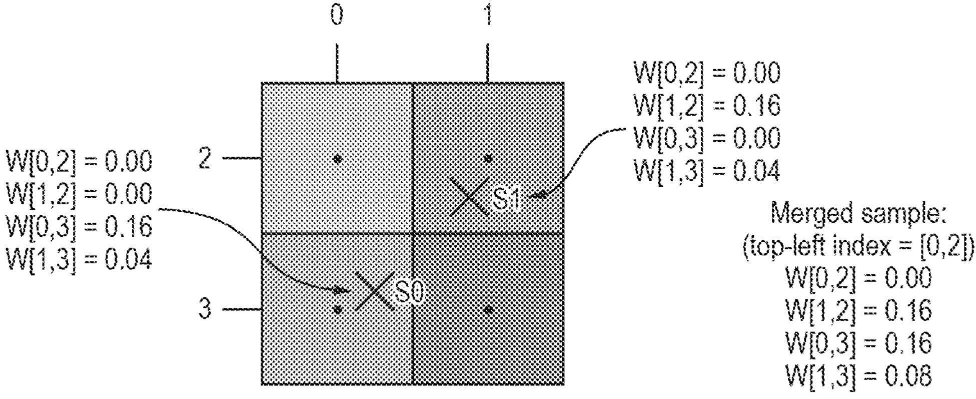
FIG. 9B shows an example of merging two texture filtering operations an embodiment.

Looking closer at texture filtering operations S0 and S1, in FIG. 9B, it can be seen that those texture filtering operations use the same four texels in their respective texture filtering operations. As such, texture filtering operations S0 and S1 are merged in accordance with FIG. 7, and the respective weights of each texel for each of the texture filtering operations S0 and S1 are summed to obtain the texel weightings for the merged texture bilinear filtering operation.

Figure 9C:
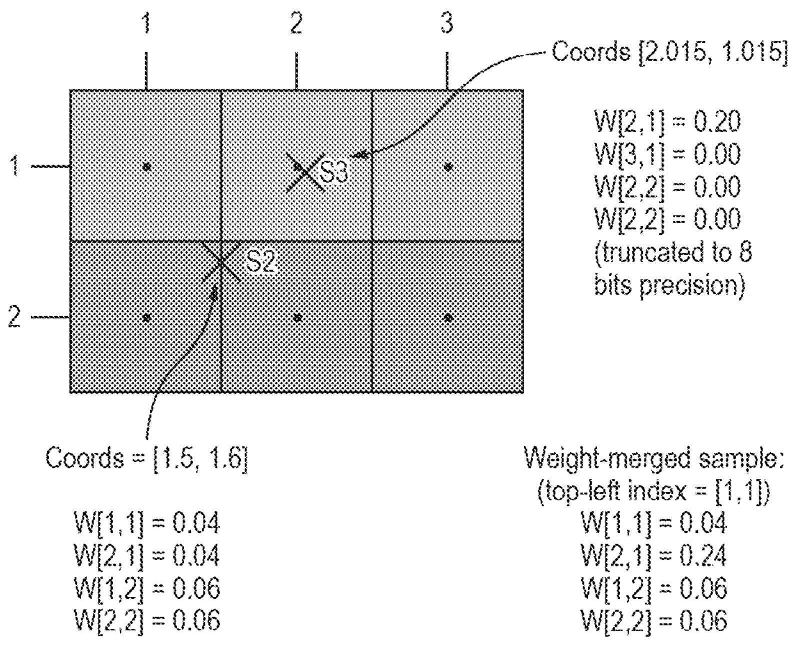
FIG. 9C shows an example of merging two texture filtering operations an embodiment.
Figure 9C:
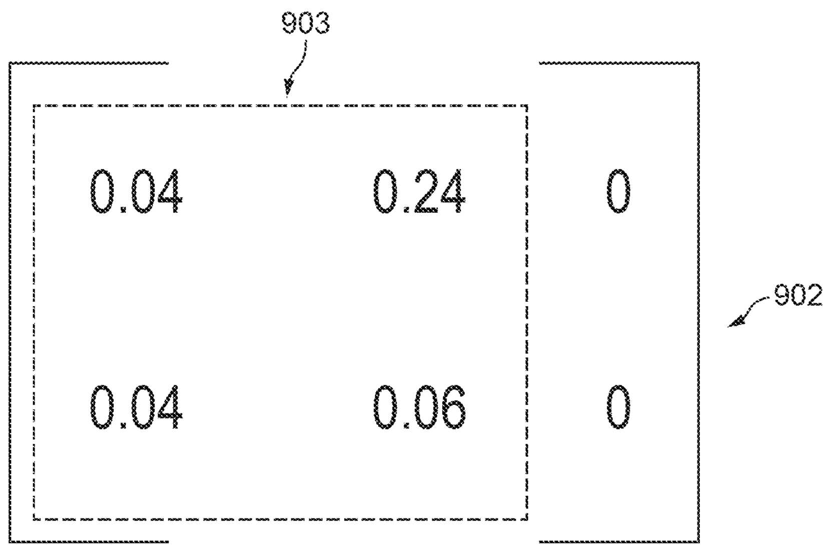

FIG. 9C shows texture filtering operations S2 and S3 in more detail. As shown in FIG. 9C, individual texture filtering operations S2 and S3 use different sets of texels, with S2 needing the texels at coordinates (1,1), (1,2), (2,1), and (2,2), and S3 needing the texels at coordinates (2,1), (2,2), (3,1), and (3,2), for their respective texture filtering operations. Thus, it may not be possible to merge these texture filtering operations in the same manner as texture filtering operations S0 and S1.

However, it can be seen in FIG. 9C that texture filtering operation S3 is close to the axis-aligned line between texels (2,1) and (2,2), and is particularly close to the texel at (2,1), whilst being distant to its other three texels that it depends upon at (2,2), (3,1), and (3,2). Therefore, e.g. when truncated to 8 bits of precision, the texture filtering operation S3 only uses the texel weight for texel (2,1), which in this example is 0.2 as the weights at its other texels are zero (sampling position S3 is sufficiently distant from those other texels such that they do not in practice contribute to the texture filtering operation).

Texture filtering operation S2, however, is in a position such that it has a non-zero weighing for each its texels, with the weightings being 0.04, 0.04, 0.06, and 0.06 for the texels at (1,1), (2,1), (1,2), and (2,2), respectively.

Summing the total weightings at each texel, and forming an array (matrix) of the summed weightings at each texel, the array 902 is obtained. As seen in array 902, the summed weightings form a 2×2 quad of weightings 903, where the weightings outside of the quad 903 are zero.

Therefore, the two operations S2 and S3, that in themselves use different texels to each other, in fact only use four different texels in total, such that they can then still be replaced with a "merged", single bilinear filtering operation that uses the four texel weightings in the 2×2 quad 903. The texture filtering operations S2 and S3 can thus be merged in the manner described in FIG. 8A.

If S3 was to be sampled at (2,1) (or along the axis-aligned line between texels (2,1) and (2,2)), such that the fractional part of the coordinates of S3 was zero, then the samples could be merged in accordance with the process set out in FIG. 7.

FIG. 10 shows an example of merging a larger number of texture filtering operations.

Figure 10A:
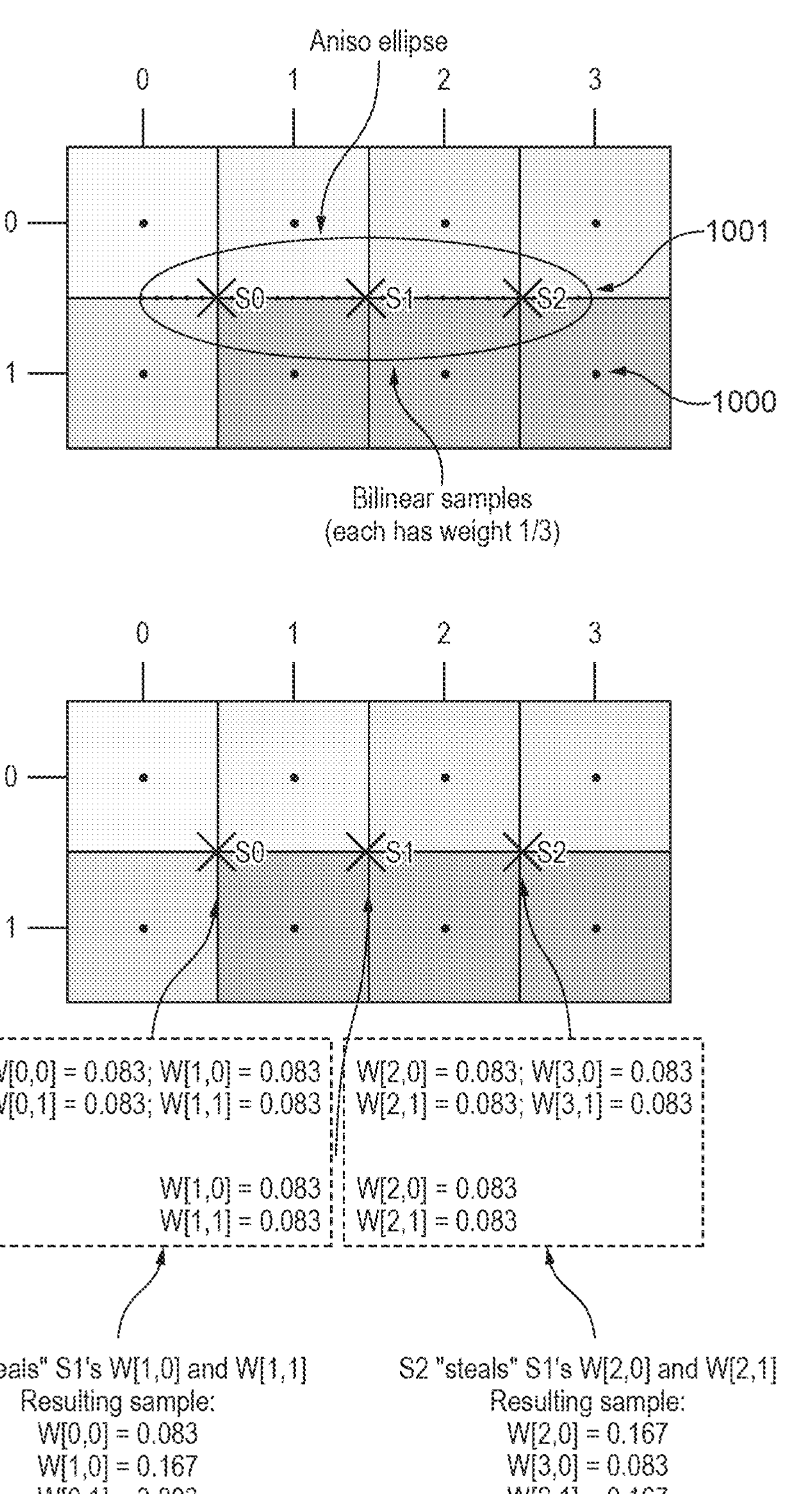
FIG. 10A shows an example of an anisotropic filtering process.
Figure 10B:
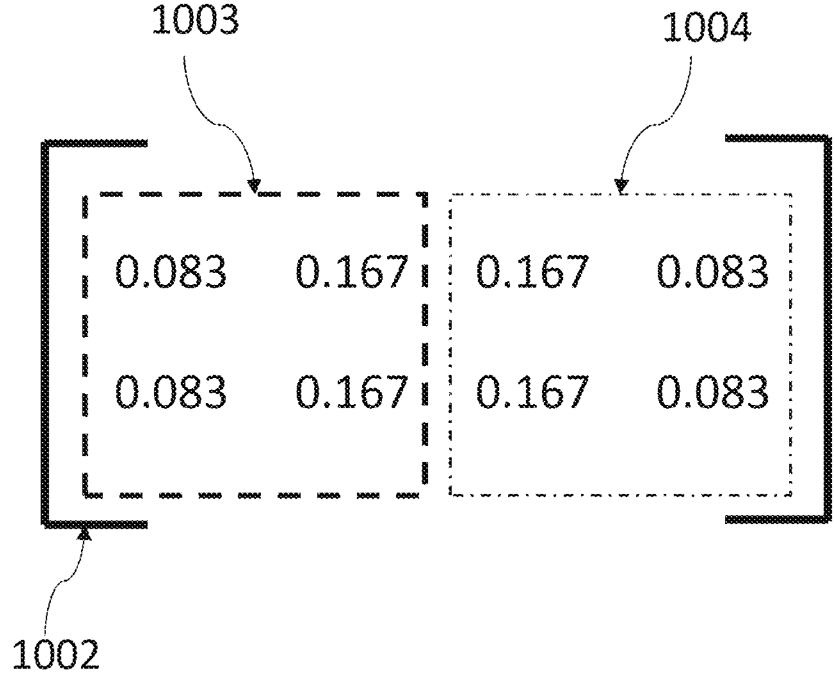
FIG. 10B shows an example of an array of texture element weights.

In particular, FIG. 10A shows three texture filtering operations S0-S2 along the major axis of an anistropic ellipse 1001. As seen in FIG. 10A, none of the three texture filtering operations share the same four texels, and none of the three texture filtering operations lay close to an axis-aligned line between the texels such that they have a zero weighting for any of their respective texels.

Rather, the three texture filtering operations S0-S2 have non-zero weightings for all four of their respective texels. Furthermore, texture filtering operations S0 and S1 both have weightings for texels (1,0) and (1,1), and texture filtering operations S1 and S3 both have weightings for texels (2,0) and (2,1), whereas texture filtering operations S0 and S2 do not share any of the same texels.

In this case, the three texture filtering operations can be effectively merged into two separate merged texture filtering operations. That is, by combining the texel weightings at each texel arising from each of the three texture filtering operations, two side-by-side 2×2 quads of texel weightings for filtering can be formed. This is due to the fact that texture filtering operation S1 shares texels with S0 and S2, meaning that when the respective texel weightings are summed S1 can be effectively merged into S0 and S2. For example, if the weighting of each texel for each texture filtering operation was 0.083, then the array 1002 in FIG. 10B would represent the weightings at each texel 1000 in FIG. 10A when combining the weightings for overlapping use of texels by the various texture filtering operations S0-S2.

As can be seen in the array 1002, there are two 2×2 quads of non-zero weighted texels 1003 and 1004, meaning that two texture filtering operations can effectively replace the initial three texture filtering operations.

Figure 11A:
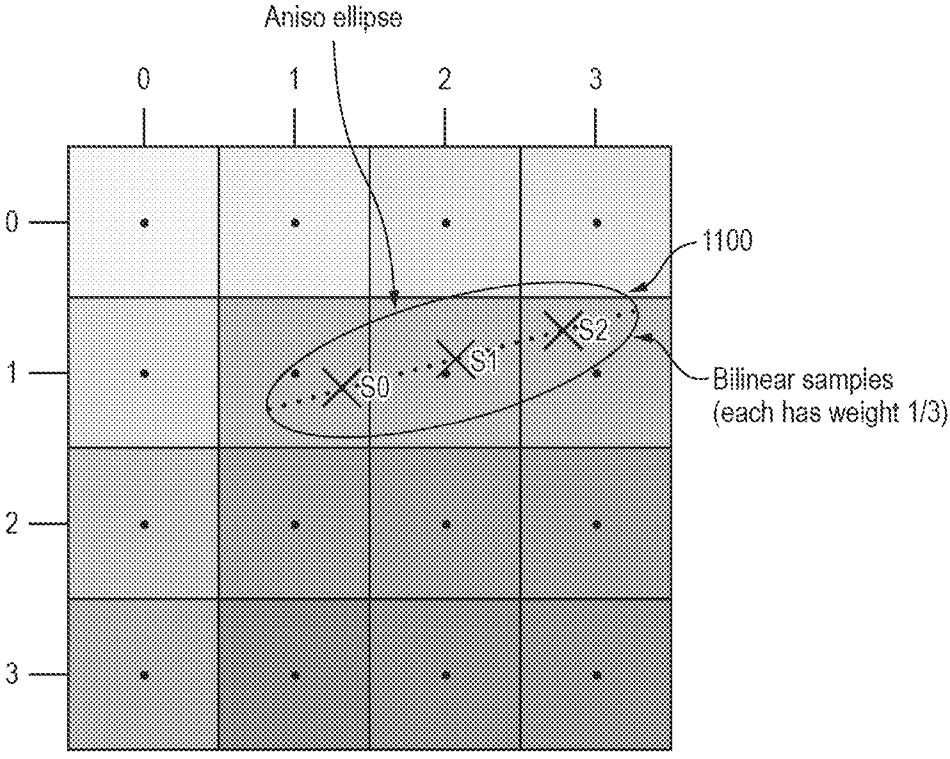
FIG. 11A shows an example of an anisotropic filtering process.

FIG. 11A shows a more complex arrangement of texture filtering operations that can be merged in accordance with the technology described herein.

In particular, FIG. 11A shows three individual texture filtering operations S0-S2 that are along the major axis of an anisotropic ellipse 1100.

Figure 11B:
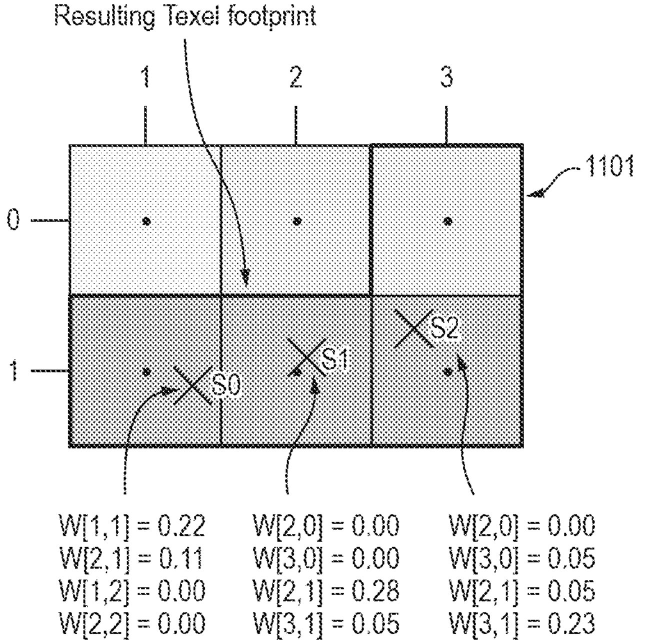
FIG. 11B shows an example of merging more than two texture filtering operations an embodiment.

FIG. 11B shows the individual texture filtering operations and their respective texel weights in more detail. In particular, FIG. 11B shows that texture filtering operation S0 only has weights for texels (1,1) and (2,1), texture filtering operation S1 only has weights for texels (2,1) and (3,1), and texture filtering operation S3 only has weights for texels (3,0), (2,1) and (3,1).

Accordingly, the three texture filtering operations only have weights for a total of four texels, as outlined by 1101. Therefore, the weight at these texels can be combined, accordingly, and a single merged texture filtering combination can be used rather than the three individual texture filtering operations.

Figure 12:
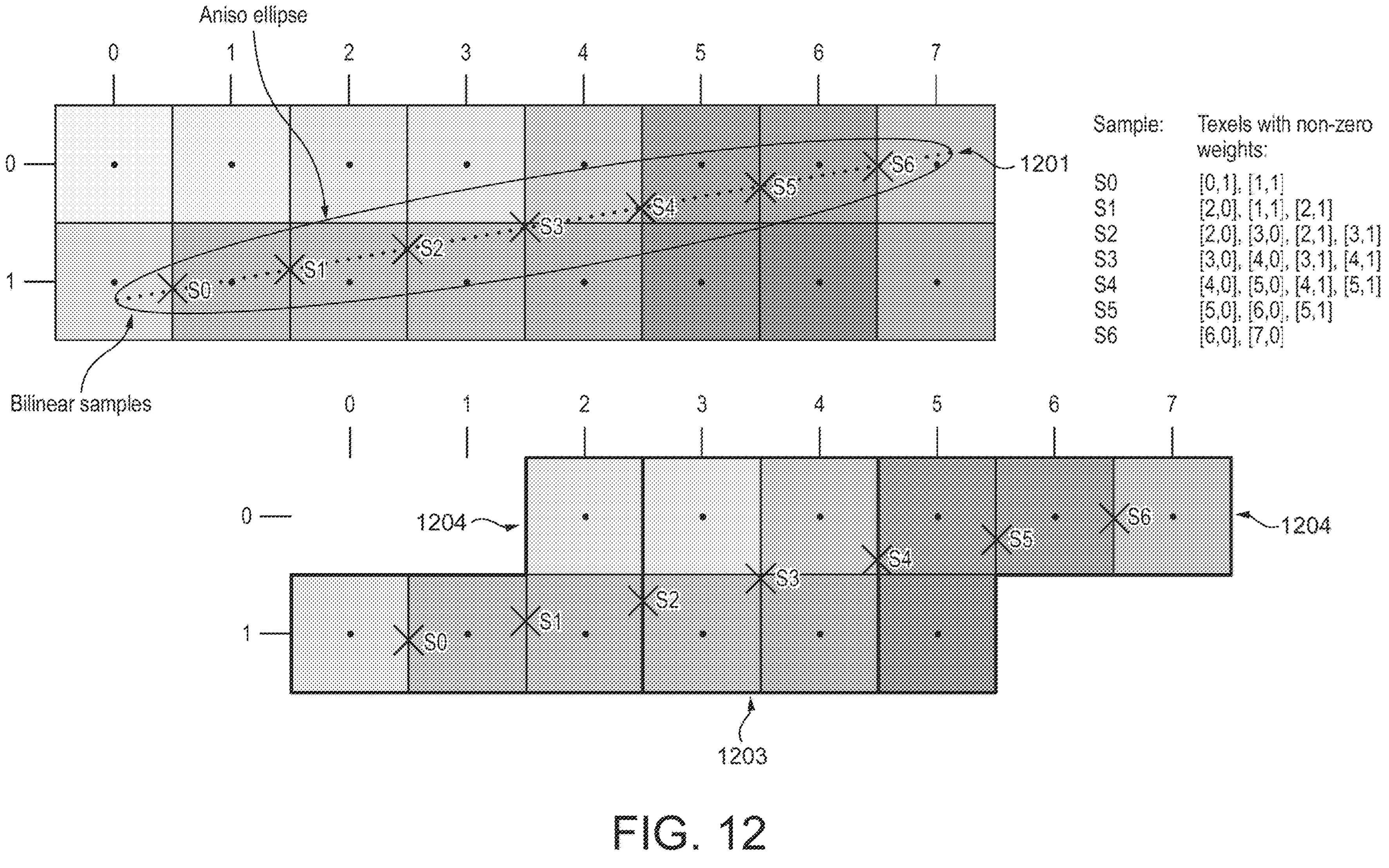
FIG. 12 shows an example of merging texture filtering operations an embodiment.

FIG. 12 shows a more complex arrangement of merging texture filtering operations.

In particular, FIG. 12 shows individual texture filtering operations S0-S6 distributed along the major axis of an anisotropic ellipse 1201.

The individual texture filtering operations S0-S7 are distributed in a manner such that:

- S0 has non-zero weightings for texels (0,1) and (1,1);
- S1 has non-zero weightings for texels (2,0), (1,1), and (2,1);
- S2 has non-zero weightings for texels (2,0), (3,0), (2,1), and (3,1);
- S3 has non-zero weightings for texels (3,0), (4,0), (3,1), and (4,1);
- S4 has non-zero weightings for texels (4,0), (5,0), (4,1), and (5,1);
- S5 has non-zero weightings for texels (5,0), (6,0), and (5,1);
- S6 has non-zero weightings for texels (6,0) and (7,0).

Therefore, the seven individual texture filtering operations can be merged into three merged filtering operations 1202, 1203, and 1204.

In particular, the texel weightings from S0, S1, and the two left-most texel weightings of S2, can be merged to form the first merged filtering operation 1202 in a manner similar to the combination of the examples presented in FIGS. 10 and 11. Furthermore, the two-right most texel weightings of S2, the texel weightings of S3, and the two left-most texel weightings of S4 can be merged to form the second merged texture filtering operation 1203 in a manner similar to that described with regard to FIG. 10. The third merged texture filtering operation 1204 is obtained by merging the texel weights from the two right-most texels weights of S4, the texel weights for S5, and the texel weights for S6, in a similar manner to FIGS. 10 and 11.

Accordingly, larger numbers of texture filtering operations can be considered for (potential) merging, with it correspondingly being determined that the texture filtering operations can be merged when the texture filtering operations can be replaced with fewer texture filtering operations (e.g. when three texture filtering operations can be replaced with two texture filtering operations or otherwise).

Figure 13:
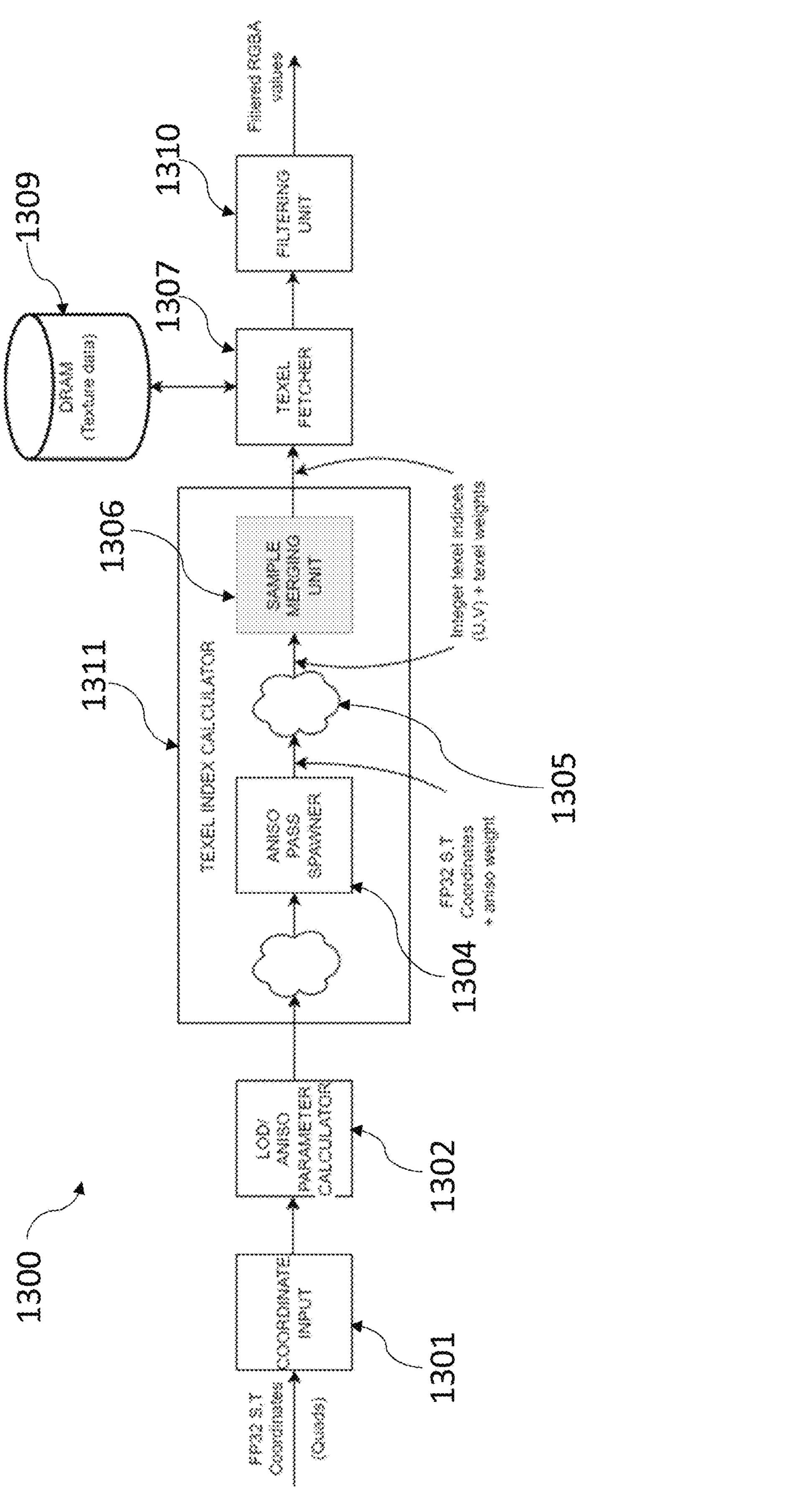
FIG. 13 shows an embodiment of a texture mapping circuit in which the technology described herein may be implemented.

FIG. 13 shows the configuration of the texture mapper (texture mapping unit/circuit), of the present embodiment, in more detail.

As shown in FIG. 13, the texture mapper (unit/circuit) 1300 receives the coordinate in the texture to be sampled (anisotropically) at a coordinate input unit (circuit) 1301.

The coordinate input unit 1301 then feeds the coordinates of the position to be sampled into an anisotropic filtering parameter calculation unit (circuit) 1302. The anisotropic parameter calculation unit determines for example the level of detail at which to sample the texture, the number of samples to take, the distance between samples, and the parameters of the anisotropic ellipse to be used.

These parameters are provided as inputs to a texel index calculation unit 1311, which, as shown in FIG. 13, includes an anisotropic pass spawning unit (circuit) 1304 that generates the corresponding set of bilinear texture filtering operations (samples) for the overall anisotropic sampling operation (pass) that is being performed, together with any required contribution weights for the samples.

There is then a texel selection unit (circuit) 1305 that determines which texels are to be used for each sample (bilinear texture filtering operation) and their respective texel weights. For example, texel unit 1305 determines the coordinates of the texels to be sampled for each individual texture sampling operation (from the sample position for the operation) and the associated weight for those texels for (bilinear) filtering (and in an embodiment also accounts for the anisotropic weights of the individual texture sampling operations themselves). The weights (of the filtering operations) may also be, e.g., truncated to 8-bits.

Sample (filtering operation) merging unit (circuit) 1306 then determines whether the individual texture filtering operations can be merged, and merges texture filtering operations, as appropriate. In one embodiment sample merging unit 1306 operates as set out with regard to FIG. 7, and in other embodiments sample merging unit 1306 operates as set out with regard to FIG. 8A.

The output of sample merging unit 1306 is thus (where appropriate) the merged texture filtering operations, together with any individual texture filtering operations that cannot be merged with another texture filtering operation, and their respective texels (texel indices) and texel weights.

The texel indices and texel weights are then passed into texel fetching unit (circuit) 1307 which obtains the associated texture data (texels) from storage (DRAM) 1309, and provides the texture data (texels) and weights to a texture filtering unit (circuit) 1310.

The texture filtering unit (circuit) 1310 performs the required texture filtering operations and outputs the corresponding filtered texture data e.g. the filtered RGBA (Red, Green, Blue, alpha) values in the case of an image/frame, e.g. to the fragment shader.

In particular, the texture filtering unit 1310 performs the (bilinear) filtering of the respective texture data (texels) associated with each (bilinear) filtering operation, as appropriate, using the corresponding set of weights, and combines the results of all the individual bilinear filtering operations for the anisotropic pass, appropriately, to provide the overall output of the anisotropic filtering (sampling) of the texture.

In one embodiment, where the texel selection unit 1305 does not account for the (anisotropic) weights of the individual texture sampling operations themselves when determining the weights of each respective texel for an individual texture filtering operation, the texture filtering unit 1310 accounts for the weight of each (bilinear) texture filtering operation (its contribution to the overall anisotropic filtering (sampling) operation) when combining each bilinear sample for the anisotropic pass in question.

In an alternative embodiment, the texel selection unit does account for the (anisotropic pass) contribution weights of the individual texture sampling operations themselves when determining the weights of each respective texel for an individual texture filtering operation, e.g. by multiplying the weights of the respective texels for the individual bilinear filtering operations by the "anisotropic weight" of that individual texture operation.

In this case, as the anisotropic weight of each individual filtering operation has already been considered and accounted for, the texel filtering unit 1310 does not account for the anisotropic weights and performs the required filtering operations using the provided texels and weights to provide the filtered data for each required filtering operations, and combines the filtered data for each required filtering operation in the anisotropic pass.

It will be understood that other combinations and arrangements are possible.

It can be seen from the above that the technology described herein, in its embodiments at least, provides a mechanism for merging appropriate texture filtering operations to reduce the overall number of texture filtering operations that has to be performed within a set of (individual) texture filtering operations when providing an overall output sampled texture value. The technology described herein therefore provides various benefits compared to other approaches.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor when sampling a texture to provide an output sampled texture value for use when rendering an output, the sampled texture comprising an array of texture data elements, each texture data element having an associated texture value;

the method comprising, when performing a texture sampling operation that uses the results of plural texture filtering operations to provide an overall output sampled texture value, each texture filtering operation using a set of one or more texture data elements from the texture being sampled to provide a corresponding output filtered texture value:

determining whether a texture filtering operation in the set of plural texture filtering operations to be performed to provide the overall output sampled texture value can be at least partially merged with another texture filtering operation in the set of texture filtering operations to be performed to provide the overall output sampled texture value;

and when it is determined that a texture filtering operation in the set of plural texture filtering operations to be performed to provide the overall output sampled texture value can be at least partially merged with another texture filtering operation in the set of texture filtering operations to be performed to provide the overall output sampled texture value, performing a merged texture filtering operation for the two texture filtering operations; and using the result of the merged texture filtering operation when providing the overall output sampled texture value.

2. The method of claim 1, wherein the texture sampling operation is to anistropically sample a texture.

3. The method of claim 1, wherein each texture filtering operation in the set of plural texture filtering operations is a bilinear filtering operation.

4. The method of claim 1, wherein the determination of whether a texture filtering operation in the set of plural texture filtering operations to be performed to provide an overall output sampled texture value can be at least partially merged with another texture filtering operation in the set of texture filtering operations to be performed to provide the overall output sampled texture value comprises at least one of:

(i) in the case where the texture comprises plural mipmaps, determining whether the texture filtering operations being considered are sampling from the same mipmap level in the texture;

(ii) in the case of a cube texture, determining whether the texture filtering operations being considered are sampling from the same cube face;

(iii) in the case of a 3D texture, determining whether the texture filtering operations being considered are sampling from the same depth (Z coordinate) in the 3D texture.

5. The method of claim 1, wherein the determination of whether a texture filtering operation in the set of plural texture filtering operations to be performed to provide an overall output sampled texture value can be at least partially merged with another texture filtering operation in the set of texture filtering operations to be performed to provide the overall output sampled texture value comprises determining whether the texture filtering operations being considered use the same texture data element(s) as each other.

6. The method of claim 1, wherein the determination of whether a texture filtering operation in the set of plural texture filtering operations to be performed to provide an overall output sampled texture value can be at least partially merged with another texture filtering operation in the set of texture filtering operations to be performed to provide the overall output sampled texture value comprises comparing the positions in the texture being sampled by each of the texture filtering operations to determine whether the texture filtering operations can be merged.

7. The method of claim 1, wherein the determining of whether a texture filtering operation in a set of plural texture filtering operations to be performed to provide an overall output sampled texture value can be at least partially merged with another texture filtering operation in the set of texture filtering operations to be performed to provide the overall output sampled texture value uses the relative contributions of the texture data elements to the respective texture filtering operations to determine whether there is a reduced set of texture data elements that actually contribute to the texture filtering operations being considered.

8. The method of claim 7, wherein it is determined that the texture filtering operations being considered can be merged when the reduced set of texture data elements that will actually contribute to the texture filtering operations have a predefined configuration.

9. The method of claim 7, further comprising:

when a merged filtering operation uses texture data elements that contribute to plural of the texture filtering operations that are being merged;

for each texture data element to be used for the merged texture filtering operation, combining all of the contribution weights for that texture data element from each of the texture filtering operations being merged to give a contribution weight for that texture data element in the merged texture filtering operation;

and using the so-combined contribution weights when performing the merged texture filtering operation.

10. The method of claim 1, further comprising:

considering successive texture filtering operations in turn from the set of texture filtering operations that make up the overall texture sampling operation to determine if they can be merged until all the texture filtering operations in the set have been considered; wherein considering successive texture filtering operations in turn from the set of texture filtering operations that make up the overall texture sampling operation to determine if they can be merged comprises:

considering whether a next texture filtering operation can be merged with a previous texture filtering operation or not; and in the case where the next texture filtering operation can be merged with the previous texture filtering operation, merging the next texture filtering operation with the previous texture filtering operation;

in the case where the next texture filtering operation cannot be merged with the previous texture filtering operation, sending the previous texture filtering operation for processing, and starting a new merging consideration process.

11. A graphics processor, the graphics processor comprising:

a texture mapping unit configured to sample textures to provide output sampled texture values for use when rendering an output, each sampled texture comprising an array of texture data elements, each texture data element having an associated texture value;

wherein the texture mapping unit comprises:

a texture filtering circuit configured to perform texture filtering operations, each texture filtering operation using a set of one or more texture data elements from a texture to provide a corresponding output filtered texture value; and a texture filtering operation merging circuit configured to, when the texture mapping unit is to perform a texture sampling operation that uses the results of plural texture filtering operations to provide an overall output sampled texture value, each texture filtering operation using a set of one or more texture data elements from the texture being sampled to provide a corresponding output filtered texture value:

determine whether a texture filtering operation in the set of plural texture filtering operations to be performed to provide the overall output sampled texture value can be at least partially merged with another texture filtering operation in the set of texture filtering operations to be performed to provide the overall output sampled texture value;

and when it is determined that a texture filtering operation in the set of plural texture filtering operations to be performed to provide the overall output sampled texture value can be at least partially merged with another texture filtering operation in the set of texture filtering operations to be performed to provide the overall output sampled texture value, cause the texture filtering circuit to:

perform a merged texture filtering operation for the two texture filtering operations; and use the result of the merged texture filtering operation when providing the overall output sampled texture value.

12. The graphics processor of claim 11, wherein the texture sampling operation is to anistropically sample a texture.

13. The graphics processor of claim 11, wherein each texture filtering operation in the set of plural texture filtering operations is a bilinear filtering operation.

14. The graphics processor of claim 11, wherein the texture filtering operation merging circuit is configured to, when determining whether a texture filtering operation in the set of plural texture filtering operations to be performed to provide an overall output sampled texture value can be at least partially merged with another texture filtering operation in the set of texture filtering operations to be performed to provide the overall output sampled texture value, perform at least one of the following:

(i) in the case where the texture comprises plural mipmaps, determine whether the texture filtering operations being considered are sampling from the same mipmap level in the texture;

(ii) in the case of a cube texture, determine whether the texture filtering operations being considered are sampling from the same cube face;

(iii) in the case of a 3D texture, determine whether the texture filtering operations being considered are sampling from the same depth (Z coordinate) in the 3D texture.

15. The graphics processor of claim 11, wherein the texture filtering operation merging circuit is configured to, when determining whether a texture filtering operation in the set of plural texture filtering operations to be performed to provide an overall output sampled texture value can be at least partially merged with another texture filtering operation in the set of texture filtering operations to be performed to provide the overall output sampled texture value, determine whether the texture filtering operations being considered use the same texture data element(s) as each other.

16. The graphics processor of claim 11, wherein the texture filtering operation merging circuit is configured to, when determining whether a texture filtering operation in the set of plural texture filtering operations to be performed to provide an overall output sampled texture value can be at least partially merged with another texture filtering operation in the set of texture filtering operations to be performed to provide the overall output sampled texture value, compare the positions in the texture being sampled by each of the texture filtering operations to determine whether the texture filtering operations can be merged.

17. The graphics processor of claim 11, wherein the texture filtering operation merging circuit is configured to use the relative contributions of the texture data elements to the respective texture filtering operations to determine whether there is a reduced set of texture data elements that actually contribute to the texture filtering operations being considered when determining whether a texture filtering operation in a set of plural texture filtering operations to be performed to provide an overall output sampled texture value can be at least partially merged with another texture filtering operation in the set of texture filtering operations to be performed to provide the overall output sampled texture value;

wherein it is determined that the texture filtering operations being considered can be merged when the reduced set of texture data elements that will actually contribute to the texture filtering operations have a predefined configuration.

18. The graphics processor of claim 11, wherein the texture filtering operation merging circuit is configured to, when a merged filtering operation uses texture data elements that contribute to plural of the texture filtering operations that are being merged, combine all the contribution weights for a given texture data element from each of the texture filtering operations being merged to provide a contribution weight for that texture data element in the merged texture filtering operation; and wherein the merged texture filtering operation uses the so-combined contribution weights.

19. The graphics processor of claim 11, wherein the texture mapper unit is configured to consider successive texture filtering operations in turn from the set of texture filtering operations that make up the overall texture sampling operation to determine if they can be merged until all the texture filtering operations in the set have been considered;

wherein the texture filtering operation merging circuit is further configured to:

when considering successive texture filtering operations in turn from a set of texture filtering operations that make up the overall texture sampling operation to determine if they can be merged, consider whether a next texture filtering operation can be merged with a previous texture filtering operation or not;

in the case where the next texture filtering operation can be merged with the previous texture filtering operation, merge the next texture filtering operation with the previous texture filtering operation; and in the case where the next texture filtering operation cannot be merged with the previous texture filtering operation, send the previous texture filtering operation to the texture filtering circuit, and start a new merging consideration process.

20. A texture mapping apparatus operable to perform graphics texturing operations, the texture mapping apparatus comprising:

a texture mapping unit configured to sample textures to provide output sampled texture values for use when rendering an output, each sampled texture comprising an array of texture data elements, each texture data element having an associated texture value;

wherein the texture mapping unit comprises:

a texture filtering circuit configured to perform texture filtering operations, each texture filtering operation using a set of one or more texture data elements from a texture to provide a corresponding output filtered texture value; and a texture filtering operation merging circuit configured to, when the texture mapping unit is to perform a texture sampling operation that uses the results of plural texture filtering operations to provide an overall output sampled texture value, each texture filtering operation using a set of one or more texture data elements from the texture being sampled to provide a corresponding output filtered texture value:

determine whether a texture filtering operation in the set of plural texture filtering operations to be performed to provide the overall output sampled texture value can be at least partially merged with another texture filtering operation in the set of texture filtering operations to be performed to provide the overall output sampled texture value;

and when it is determined that a texture filtering operation in the set of plural texture filtering operations to be performed to provide the overall output sampled texture value can be at least partially merged with another texture filtering operation in the set of texture filtering operations to be performed to provide the overall output sampled texture value, cause the texture filtering circuit to:

perform a merged texture filtering operation for the two texture filtering operations; and use the result of the merged texture filtering operation when providing the overall output sampled texture value.

21. A non-transitory computer readable storage medium storing computer software code which when executing on one or more processors performs a method of operating a graphics processor when sampling a texture to provide an output sampled texture value for use when rendering an output, the sampled texture comprising an array of texture data elements, each texture data element having an associated texture value;

the method comprising, when performing a texture sampling operation that uses the results of plural texture filtering operations to provide an overall output sampled texture value, each texture filtering operation using a set of one or more texture data elements from the texture being sampled to provide a corresponding output filtered texture value:

determining whether a texture filtering operation in the set of plural texture filtering operations to be performed to provide the overall output sampled texture value can be at least partially merged with another texture filtering operation in the set of texture filtering operations to be performed to provide the overall output sampled texture value;

and when it is determined that a texture filtering operation in the set of plural texture filtering operations to be performed to provide the overall output sampled texture value can be at least partially merged with another texture filtering operation in the set of texture filtering operations to be performed to provide the overall output sampled texture value, performing a merged texture filtering operation for the two texture filtering operations; and using the result of the merged texture filtering operation when providing the overall output sampled texture value.

* * * * *